United States Patent
Lee et al.

(10) Patent No.: US 6,746,363 B1
(45) Date of Patent: Jun. 8, 2004

(54) MULTI-SPEED DUAL-CLUTCH PLANETARY TRANSMISSION MECHANISMS HAVING A STATIONARY GEAR MEMBER AND ONE BRAKE

(75) Inventors: Chunhao J. Lee, Troy, MI (US); Patrick B. Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 8 days.

(21) Appl. No.: 10/303,680

(22) Filed: Nov. 25, 2002

(51) Int. Cl.⁷ .............................. F16H 3/66; F16H 3/78
(52) U.S. Cl. .......................... 475/303; 475/296
(58) Field of Search .................. 475/269, 296, 475/303, 323

(56) References Cited

U.S. PATENT DOCUMENTS

| | | | |
|---|---|---|---|
| 4,070,927 A | 1/1978 | Polak | 74/765 |
| 4,709,594 A | 12/1987 | Maeda | 74/753 |
| 5,106,352 A | 4/1992 | Lepelletier | 475/280 |
| 5,385,064 A | 1/1995 | Reece | 74/331 |
| 5,497,867 A | 3/1996 | Hirsch et al. | 192/48.91 |
| 5,560,461 A | 10/1996 | Loeffler | 192/53.32 |
| 5,599,251 A | 2/1997 | Beim et al. | 475/275 |
| 5,641,045 A | 6/1997 | Ogawa et al. | 192/53.341 |
| 5,651,435 A | 7/1997 | Perosky et al. | 192/4 |
| 5,975,263 A | 11/1999 | Forsyth | 192/53.32 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,217,474 B1 | 4/2001 | Ross et al. | 475/269 |
| 6,354,416 B1 | 3/2002 | Eo | 192/53.341 |

FOREIGN PATENT DOCUMENTS

JP 09126283 5/1997

*Primary Examiner*—Ankur Parekh
(74) *Attorney, Agent, or Firm*—Kathryn A. Marra

(57) ABSTRACT

The family of transmissions has a plurality of members that can be utilized in powertrains to provide at least six forward speed ratios and one reverse speed ratio. The transmission family members include four planetary gear sets, two input clutches, eight or nine torque transmitting mechanisms, two fixed interconnections, and one grounded planetary gear member. The invention provides a low content multi-speed dual clutch transmission mechanism wherein the two input clutches alternately connect the engine to realize odd and even number speed ratio ranges. The torque transmitting mechanisms provide connections between various gear members, the fixed interconnections, the first input clutch, the output shaft, and the transmission housing, and are operated in combinations of three to establish at least six forward speed ratios and at least one reverse speed ratio.

37 Claims, 9 Drawing Sheets

| | RATIOS | 62 | 63 | 64 | 65 | 66 | 67 | 68 | 69 | 70 | 71 | 72 |
|---|---|---|---|---|---|---|---|---|---|---|---|---|
| REVERSE | -1.80 | X | | X | X | | X | | | | | |
| NEUTRAL | 0 | | | | | | | | | | | |
| 1 | 3.59 | X | | X | | X | | X | | | | |
| 2 | 1.84 | | X | | | | | | X | | | X |
| 3 | 1 | X | | | X | | X | X | | | | |
| 4 | 0.67 | | X | | | | | | X | X | | |
| 5 | 0.55 | X | | X | | X | X | | | | | |
| 6 | 0.45 | | X | | | | | | | X | | X |

(X ENGAGED CLUTCH/SYNCHRONIZER)

RING GEAR / SUN GEAR TOOTH RATIO:
$\frac{R_1}{S_1} = 2.00$
$\frac{R_2}{S_2} = 1.80$
$\frac{R_3}{S_3} = 1.81$
$\frac{R_4}{S_4} = 1.52$

| RATIO SPREAD | 8.05 |
|---|---|
| RATIO STEPS | |
| REV/1 | -0.50 |
| 1/2 | 1.95 |
| 2/3 | 1.84 |
| 3/4 | 1.50 |
| 4/5 | 1.22 |
| 5/6 | 1.22 |

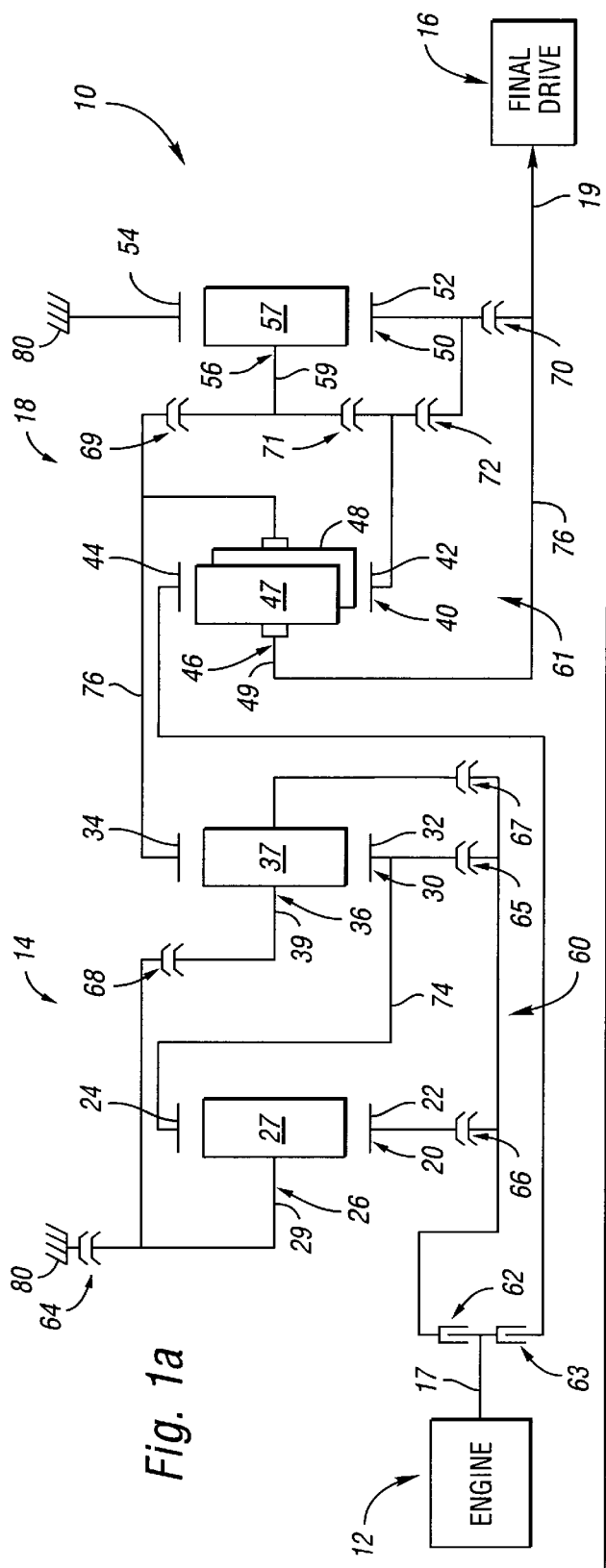

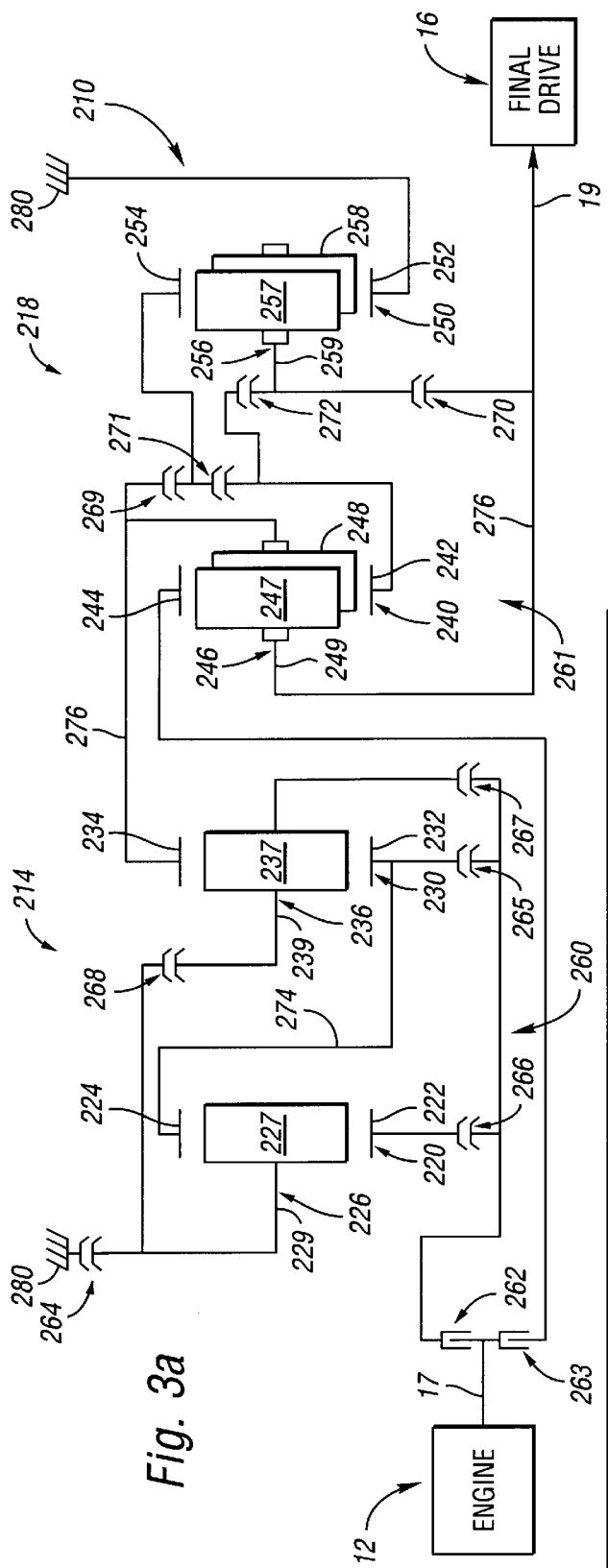

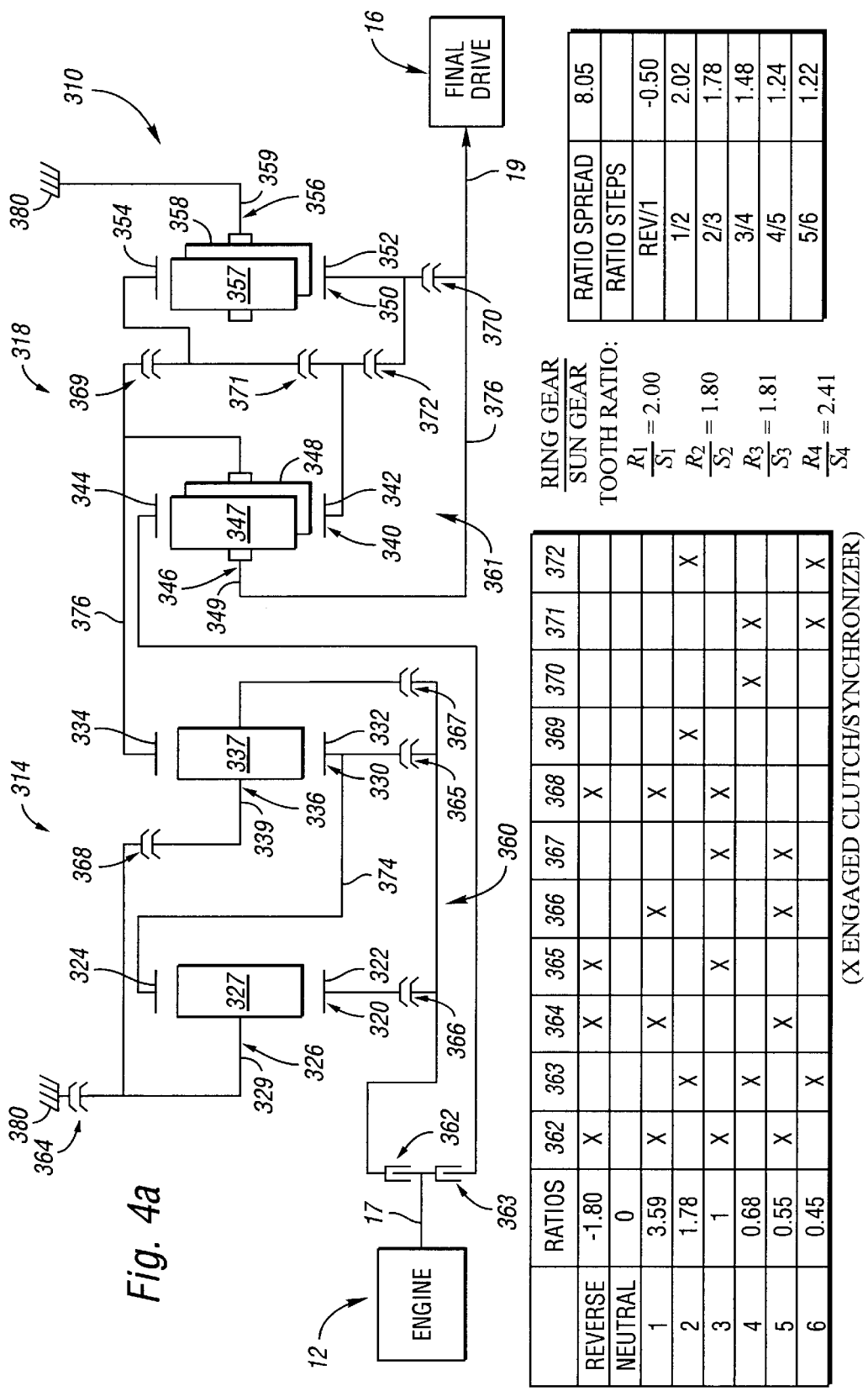

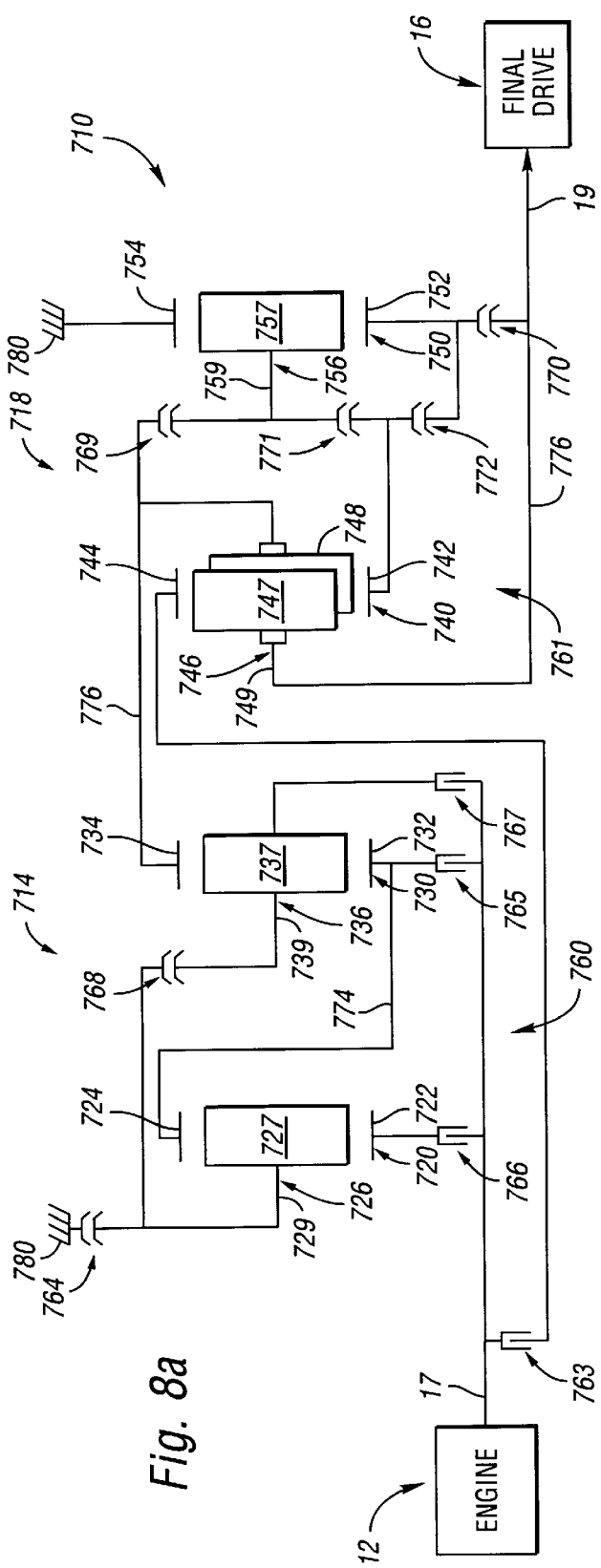

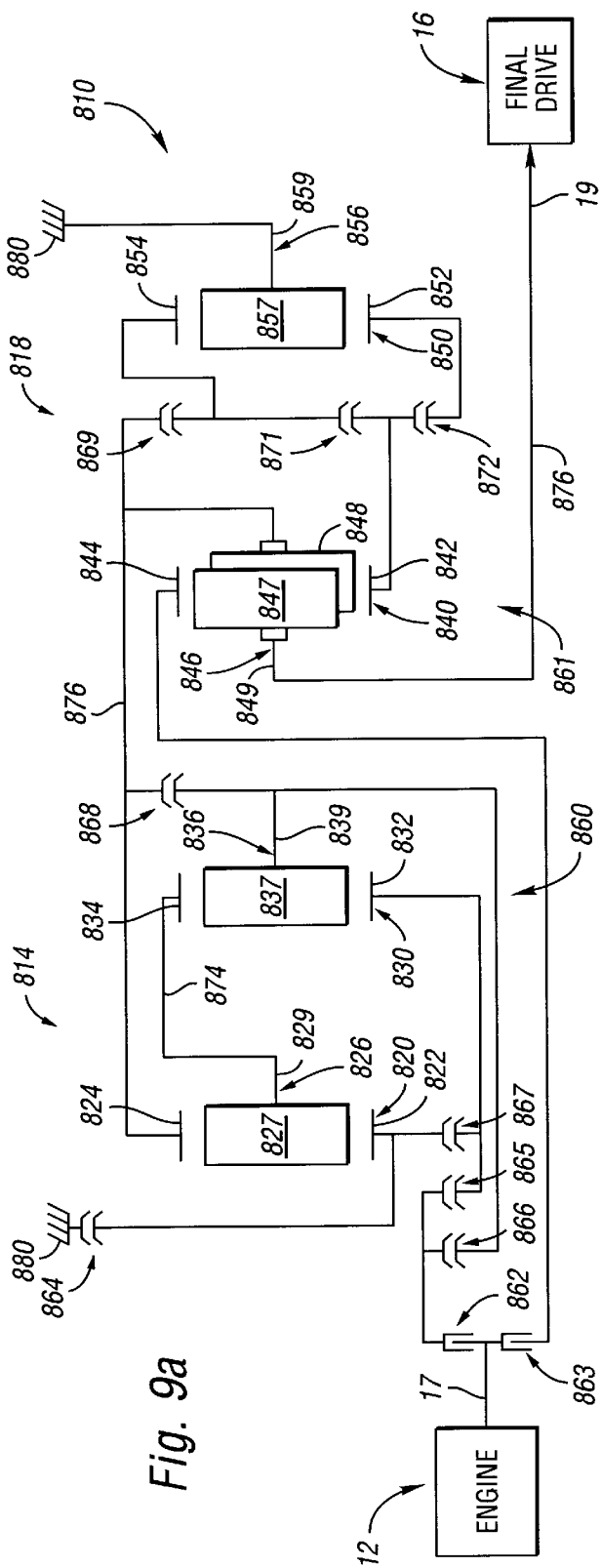

MULTI-SPEED DUAL-CLUTCH PLANETARY TRANSMISSION MECHANISMS HAVING A STATIONARY GEAR MEMBER AND ONE BRAKE

TECHNICAL FIELD

The present invention relates to a family of power transmissions having two input clutches which selectively connect an input shaft to first and second pairs of planetary gear sets to provide at least six forward speed ratios and one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times.

A primary focus of transmission and engine design work is in the area of increasing vehicle fuel efficiency. Manual transmissions typically provide improved vehicle fuel economy over automatic transmissions because automatic transmissions use a torque converter for vehicle launch and multiple plate hydraulically-applied clutches for gear engagement. Clutches of this type, left unengaged or idling, impose a parasitic drag torque on a drive line due to the viscous shearing action which exists between the plates and discs rotating at different speeds relative to one another. This drag torque adversely affects vehicle fuel economy for automatic transmissions. Also, the hydraulic pump that generates the pressure needed for operating the above-described clutches further reduces fuel efficiency associated with automatic transmissions. Manual transmissions eliminate these problems.

While manual transmissions are not subject to the above described fuel efficiency related problems, manual transmissions typically provide poor shift quality because a significant torque interruption is required during each gear shift as the engine is disengaged from the transmission by the clutch to allow shafts rotating at different speeds to be synchronized.

So called "automated manual" transmissions provide electronic shifting in a manual transmission configuration which, in certain circumstances, improves fuel efficiency by eliminating the parasitic losses associated with the torque converter and hydraulic pump needed for clutching. Like manual transmissions, a drawback of automated manual transmissions is that the shift quality is not as high as an automatic transmission because of the torque interruption during shifting.

So called "dual-clutch automatic" transmissions also eliminate the torque converter and replace hydraulic clutches with synchronizers but they go further to provide gear shift quality which is superior to the automated manual transmission and similar to the conventional automatic transmission, which makes them quite attractive. However, most known dual-clutch automatic transmissions include a lay shaft or countershaft gear arrangement, and have not been widely applied in vehicles because of their complexity, size and cost. For example, a dual clutch lay shaft transmission could require eight sets of gears, two input/shift clutches and seven synchronizers/dog clutches to provide six forward speed ratios and a reverse speed ratio. An example of a dual-clutch automatic transmission is described in U.S. Pat. No. 5,385,064, which is hereby incorporated by reference.

SUMMARY OF THE INVENTION

The invention provides a low content multi-speed dual-clutch transmission family utilizing planetary gear sets rather than lay shaft gear arrangements. In particular, the invention includes four planetary gear sets, two input/shift clutches, and nine selectable torque transmitting mechanisms to provide at least six forward speed ratios and a reverse speed ratio.

According to one aspect of the invention, the family of transmissions has four planetary gear sets, each of which includes a first, second and third member, which members may comprise a sun gear, ring gear, or a planet carrier assembly member.

In referring to the first, second, third and fourth gear sets in this description and in the claims, these sets may be counted "first" to "fourth" in any order in the drawings (i.e. left-to-right, right-to-left, etc.).

In another aspect of the present invention, each of the planetary gear sets may be of the single pinion type or of the double pinion type.

In yet another aspect of the present invention, the first member of the first planetary gear set is continuously connected with the first member of the second planetary gear set through a first interconnecting member.

In yet another aspect of the present invention, a member of the first or second planetary gear set is continuously connected with the first member of the third planetary gear set and the output shaft through a second interconnecting member.

In yet another aspect of the present invention, the first member of the fourth planetary gear set is continuously connected with a stationary member (transmission housing).

In accordance with a further aspect of the invention, a first input clutch selectively connects the input shaft with members of the first and second planetary gear set through other torque-transmitting mechanisms, such as synchronizers.

In accordance with another aspect of the present invention, a second input clutch selectively connects the input shaft with the second member of the third planetary gear set.

In another aspect of the invention, first and second torque transmitting mechanisms, such as synchronizers, selectively connect members of the first and second planetary gear sets with the first input clutch.

In another aspect of the invention, third and fourth torque transmitting mechanisms, such as synchronizers, selectively connect members of the first or second planetary gear set with other members of the first or second planetary gear set, or with the first input clutch.

In still a further aspect of the invention, fifth, sixth, seventh and eighth torque transmitting mechanisms, such as synchronizers, selectively connect members of the third planetary gear set with second and third members of the fourth planetary gear set.

In still another aspect of the invention, a ninth torque transmitting mechanism, such as braking synchronizer, selectively connects a member of the first or second planetary gear set with the stationary member.

In accordance with a further aspect of the invention, the input clutches and torque transmitting mechanisms are selectively engaged in combinations of at least three to provide at least six forward speed ratios and a reverse speed ratio.

In accordance with a further aspect of the invention, the nine torque transmitting mechanisms may comprise synchronizers.

In accordance with a further aspect of the invention, the first input clutch is applied for odd number speed ranges, and the second input clutch is applied for even number speed ranges, or vice versa.

In another aspect of the invention, the first input clutch and the second input clutch are interchanged (i.e. alternately engaged) to shift from odd number speed range to even number speed range, or vice versa.

In accordance with a further aspect of the invention, each selected torque transmitting mechanism for a new speed ratio is engaged prior to shifting of the input clutches to achieve shifts without torque interruptions.

In accordance with a further aspect of the invention, at least one pair of synchronizers is executed as a double synchronizer to reduce cost and package size.

In accordance with a further aspect of the invention, the first input clutch can be eliminated and the first and second torque transmitting mechanisms can be used as input clutches to further reduce content.

In accordance with a further aspect of the invention, at least one of the torque transmitting mechanisms can be eliminated to realize five forward speed ratios and a reverse speed ratio.

The above objects, features, advantages, and other objects, features, and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission incorporating a family member of the present invention;

FIG. 1b is a truth table and chart depicting some of the operating characteristics of the powertrain shown in FIG. 1a;

FIG. 2a is a schematic representation of a powertrain having a planetary transmission incorporating another family member of the present invention;

FIG. 2b is a truth table and chart depicting some of the operating characteristics of the powertrain shown in FIG. 2a;

FIG. 3a is a schematic representation of a powertrain having a planetary transmission incorporating another family member of the present invention;

FIG. 3b is a truth table and chart depicting some of the operating characteristics of the powertrain shown in FIG. 3a;

FIG. 4a is a schematic representation of a powertrain having a planetary transmission incorporating another family member of the present invention;

FIG. 4b is a truth table and chart depicting some of the operating characteristics of the powertrain shown in FIG. 4a;

FIG. 5a is a schematic representation of a powertrain having a planetary transmission incorporating another family member of the present invention;

FIG. 5b is a truth table and chart depicting some of the operating characteristics of the powertrain shown in FIG. 5a;

FIG. 6a is a schematic representation of a powertrain having a planetary transmission incorporating another family member of the present invention;

FIG. 6b is a truth table and chart depicting some of the operating characteristics of the powertrain shown in FIG. 6a;

FIG. 7a is a schematic representation of a powertrain having a planetary transmission incorporating another family member of the present invention;

FIG. 7b is a truth table and chart depicting some of the operating characteristics of the powertrain shown in FIG. 7a;

FIG. 8a is a schematic representation of a powertrain having a planetary transmission incorporating another family member of the present invention;

FIG. 8b is a truth table and chart depicting some of the operating characteristics of the powertrain shown in FIG. 8a;

FIG. 9a is a schematic representation of a powertrain having a planetary transmission incorporating another family member of the present invention; and FIG. 9b is a truth table and chart depicting some of the operating characteristics of the powertrain shown in FIG. 9a.

DESCRIPTION OF THE PREFERRED EMBODIMENTS

Figures 2A, 2B:
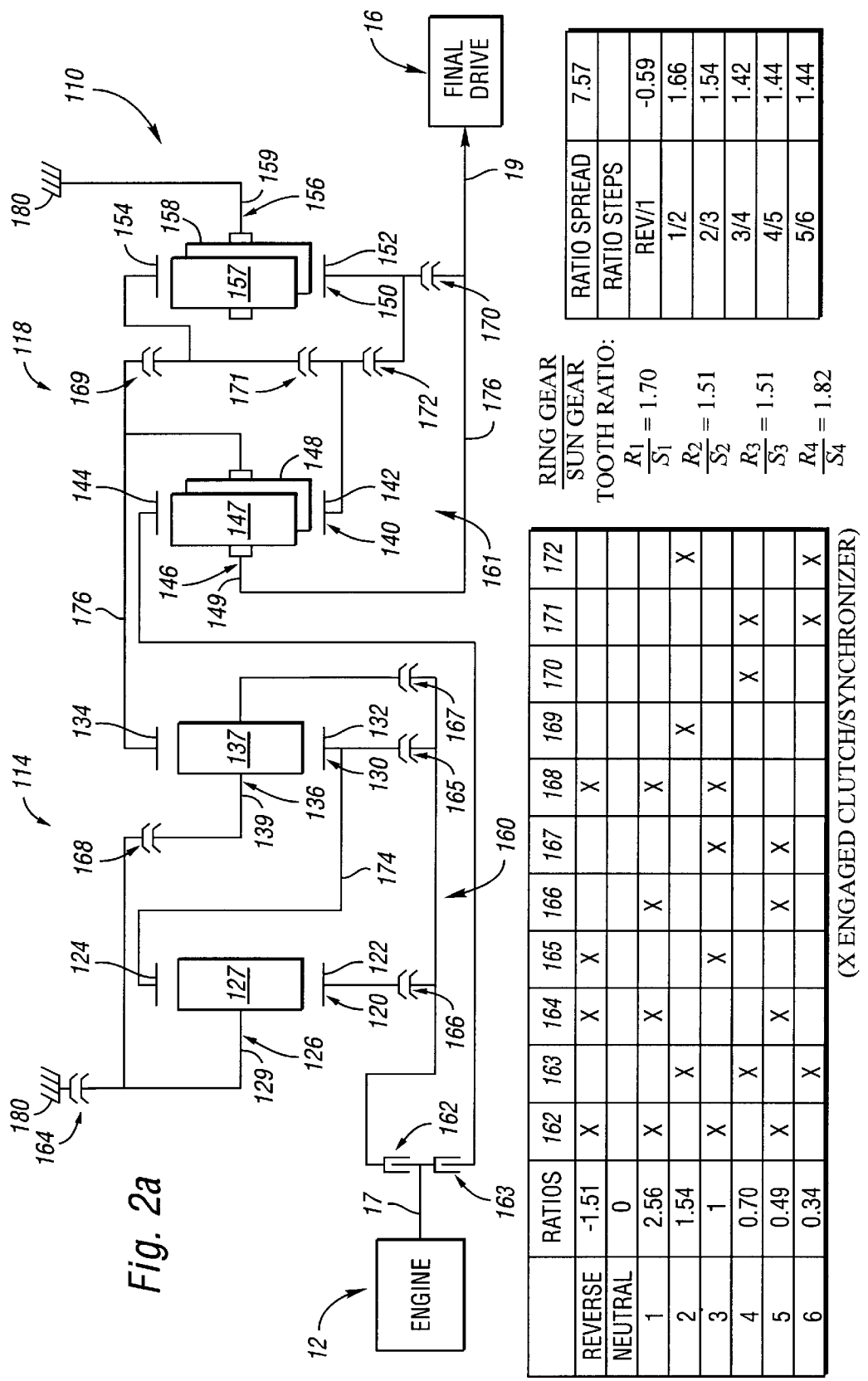

Referring to the drawings, wherein like characters represent the same or corresponding parts throughout the several views, there is shown in FIG. 1a a powertrain 10 having a conventional engine 12, a planetary transmission 14, and a conventional final drive mechanism 16.

The planetary transmission 14 includes an input shaft 17 continuously connected with the engine 12, a planetary gear arrangement 18, and an output shaft 19 continuously connected with the final drive mechanism 16. The planetary gear arrangement 18 includes four planetary gear sets 20, 30, 40 and 50.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of intermeshing pinion gears 47, 48 rotatably mounted on a carrier member 49 and disposed in meshing relationship with the ring gear member 44 and the sun gear member 42, respectively.

The planetary gear set 50 includes a sun gear member 52, a ring gear member 54, and a planet carrier assembly member 56. The planet carrier assembly member 56 includes a plurality of pinion gears 57 rotatably mounted on a carrier member 59 and disposed in meshing relationship with both the sun gear member 52 and the ring gear member 54.

As a result of the dual clutch arrangement of the invention, the four planetary gear sets 20, 30, 40 and 50 are divided into first and second transmission subsets 60, 61 which are alternatively engaged to provide odd number and even number speed ranges, respectively. Transmission subset 60 includes planetary gear sets 20 and 30, and transmission subset 61 includes planetary gear sets 40 and 50. The output shaft 19 is continuously connected with members of both subsets 60 and 61.

As mentioned above, the first and second input clutches 62, 63 are alternatively engaged for transmitting power from the input shaft 17 to transmission subset 60 or transmission subset 61. The first and second input clutches 62, 63 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 60, 61 prior to engaging the respective input clutches 62, 63. The preselection is achieved by means of electronically controlled synchronizers. As shown, the planetary gear arrangement includes nine torque transmitting mechanisms 64, 65, 66, 67, 68, 69, 70, 71 and 72. The torque transmitting mechanism 64 comprises a braking synchronizer, and the torque transmitting mechanisms 65, 66, 67, 68, 69, 70, 71 and 72 comprise rotating synchronizers.

By way of example, synchronizers which may be implemented as the rotating and/or braking synchronizers referenced herein are shown in the following patents, each of which are incorporated by reference in their entirety: U.S. Pat. Nos. 5,651,435; 5,975,263; 5,560,461; 5,641,045; 5,497,867; 6,354,416.

The braking synchronizers and rotating synchronizers are referenced in the claims as follows: first and second torque transmitting mechanisms 65, 66; third and fourth torque transmitting mechanisms 67, 68; fifth, sixth, seventh and eighth torque transmitting mechanisms 69, 70, 71, 72; and ninth torque transmitting mechanism 64. Other family members are similarly referenced in the claims (i.e. first and second torque transmitting mechanisms connected between input shaft and first and second planetary gear sets; third and fourth torque transmitting mechanisms of left transmission subset in Figures; fifth, sixth, seventh and eighth torque transmitting mechanisms of right transmission subset; and braking synchronizer).

Accordingly, the input shaft 17 is alternately connected with the first and second transmission subsets 60, 61 (i.e. through the clutch 62 to synchronizers 65, 66, 67, and through clutch 63 to ring gear member 44). The ring gear member 24 is continuously connected with the sun gear member 32 through the interconnecting member 74. The planet carrier assembly member 46 is continuously connected with the ring gear member 34 and the output shaft 19 through the interconnecting member 76. The ring gear member 54 is continuously connected with the transmission housing 80.

The planet carrier assembly member 26 is selectively connectable with the transmission housing 80 through the braking synchronizer 64. The sun gear member 32 is selectively connectable with the input shaft 17 through the input clutch 62 and the rotating synchronizer 65. The sun gear member 22 is selectively connectable with the input shaft 17 through the input clutch 62 and the rotating synchronizer 66. The planet carrier assembly member 36 is selectively connectable with the input shaft 17 through the input clutch 62 and the rotating synchronizer 67. The planet carrier assembly member 26 is selectively connectable with the planet carrier assembly member 36 through the rotating synchronizer 68. The planet carrier assembly member 46 is selectively connectable with the planet carrier assembly member 56 through the rotating synchronizer 69. The planet carrier assembly member 46 is selectively connectable with the sun gear member 52 through the rotating synchronizer 70. The sun gear member 42 is selectively connectable with the planet carrier assembly member 56 through the rotating synchronizer 71. The sun gear member 42 is selectively connectable with the sun gear member 52 through the rotating synchronizer 72.

As shown in FIG. 1b, and in particular the truth table disclosed therein, the input clutches and torque transmitting mechanisms are selectively engaged in combinations of at least three to provide six forward speed ratios and a reverse speed ratio.

The reverse speed ratio is established with the engagement of the input clutch 62, the braking synchronizer 64 and the rotating synchronizers 65, 68. The input clutch 62 and the rotating synchronizer 65 connect the sun gear member 32 to the input shaft 17. The braking synchronizer 64 connects the planet carrier assembly member 26 to the transmission housing 80. The rotating synchronizer 68 connects the planet carrier assembly member 26 to the planet carrier assembly member 36. The ring gear member 24 and the sun gear member 32 rotate at the same speed as the input shaft 17. The planet carrier assembly members 26, 36 do not rotate. The ring gear member 34 and the planet carrier assembly member 46 rotate at the same speed as the output shaft 19. The ring gear member 34, and therefore the output shaft 19, rotates at a speed determined from the speed of the sun gear member 32 and the ring gear/sun gear tooth ratio of the planetary gear set 30. The numerical value of the reverse speed ratio is determined utilizing the ring gear/sun gear tooth ratio of the planetary gear set 30.

The first forward speed ratio is established with the engagement of the input clutch 62, the braking synchronizer 64 and the rotating synchronizers 66, 68. The input clutch 62 and the rotating synchronizer 66 connect the sun gear member 22 to the input shaft 17. The braking synchronizer 64 connects the planet carrier assembly member 26 to the transmission housing 80. The rotating synchronizer 68 connects the planet carrier assembly member 26 to the planet carrier assembly member 36. The sun gear member 22 rotates at the same speed as the input shaft 17. The planet carrier assembly members 26, 36 do not rotate. The ring gear member 24 rotates at the same speed as the sun gear member 32. The ring gear member 24 rotates at a speed determined from the speed of the sun gear member 22 and the ring gear/sun gear tooth ratio of the planetary gear set 20. The ring gear member 34 and the planet carrier assembly member 46 rotate at the same speed as the output shaft 19. The ring gear member 34, and therefore the output shaft 19, rotates at a speed determined from the speed of the sun gear member 32 and the ring gear/sun gear tooth ratio of the planetary gear set 30. The numerical value of the first forward speed ratio is determined utilizing the ring gear/sun gear tooth ratios of the planetary gear sets 20, 30.

The second forward speed ratio is established with the engagement of the input clutch 63 and the rotating synchronizers 69, 72. The input clutch 63 connects the ring gear member 44 to the input shaft 17. The rotating synchronizer 69 connects the planet carrier assembly member 46 to the planet carrier assembly member 56. The rotating synchronizer 72 connects the sun gear member 42 to the sun gear member 52. The sun gear member 42 rotates at the same speed as the sun gear member 52. The planet carrier assembly members 46, 56 rotate at the same speed as the output shaft 19. The ring gear member 44 rotates at the same speed as the input shaft 17. The planet carrier assembly member 46, and therefore the output shaft 19, rotates at a speed determined from the speed of the ring gear member 44, the speed of the sun gear member 42 and the ring gear/sun gear tooth ratio of the planetary gear set 40. The ring gear member 54 does not rotate. The planet carrier assembly member 56 rotates at a speed determined from the speed of the sun gear member 52 and the ring gear/sun gear tooth ratio of the planetary gear set 50. The numerical value of the second forward speed ratio is determined utilizing the ring gear/sun gear tooth ratios of the planetary gear sets 40, 50.

The third forward speed ratio is established with the engagement of the input clutch 62 and the rotating synchronizer 65, 67 and 68. In this configuration, the input shaft 17 is directly connected to the output shaft 19. The numerical value of the third forward speed ratio is 1.

The fourth forward speed ratio is established with the engagement of the input clutch 63 and the rotating synchronizers 70, 71. The input clutch 63 connects the ring gear member 44 to the input shaft 17. The rotating synchronizer 70 connects the planet carrier assembly member 46 to the sun gear member 52. The rotating synchronizer 71 connects the sun gear member 42 to the planet carrier assembly member 56. The sun gear member 42 rotates at the same speed as the planet carrier assembly member 56. The planet carrier assembly member 46 and the sun gear member 52 rotate at the same speed as the output shaft 19. The ring gear member 44 rotates at the same speed as the input shaft 17. The planet carrier assembly member 46, and therefore the output shaft 19, rotates at a speed determined from the speed of the ring gear member 44, the speed of the sun gear member 42 and the ring gear/sun gear tooth ratio of the planetary gear set 40. The ring gear member 54 does not rotate. The planet carrier assembly member 56 rotates at a speed determined from the speed of the sun gear member 52 and the ring gear/sun gear tooth ratio of the planetary gear set 50. The numerical value of the fourth forward speed ratio is determined utilizing the ring gear/sun gear tooth ratios of the planetary gear sets 40, 50.

The fifth forward speed ratio is established with the engagement of the input clutch 62, the braking synchronizer 64 and the rotating synchronizers 66, 67. The input clutch 62 and the rotating synchronizers 66, 67 connect the sun gear member 22 and the planet carrier assembly member 36 to the input shaft 17. The braking synchronizer 64 connects the planet carrier assembly member 26 to the transmission housing 80. The sun gear member 22 and the planet carrier assembly member 36 rotate at the same speed as the input shaft 17. The planet carrier assembly member 26 does not rotate. The ring gear member 24 rotates at the same speed as the sun gear member 32. The ring gear member 24 rotates at a speed determined from the speed of the sun gear member 22 and the ring gear/sun gear tooth ratio of the planetary gear set 20. The ring gear member 34 and the planet carrier assembly member 46 rotate at the same speed as the output shaft 19. The ring gear member 34, and therefore the output shaft 19, rotates at a speed determined from the speed of the planet carrier assembly member 36, the speed of the sun gear member 32 and the ring gear/sun gear tooth ratio of the planetary gear set 30. The numerical value of the fifth forward speed ratio is determined utilizing the ring gear/sun gear tooth ratios of the planetary gear sets 20, 30.

The sixth forward speed ratio is established with the engagement of the input clutch 63 and the rotating synchronizers 71, 72. The input clutch 63 connects the ring gear member 44 to the input shaft 17. The rotating synchronizer 71 connects the sun gear member 42 to the planet carrier assembly member 56. The rotating synchronizer 72 connects the sun gear member 42 to the sun gear member 52. The sun gear member 42 and the planetary gear set 50 do not rotate. The planet carrier assembly member 46 rotates at the same speed as the output shaft 19. The ring gear member 44 rotates at the same speed as the input shaft 17. The planet carrier assembly member 46, and therefore the output shaft 19, rotates at a speed determined from the speed of the ring gear member 44 and the ring gear/sun gear tooth ratio of the planetary gear set 40. The numerical value of the sixth forward speed ratio is determined utilizing the ring gear/sun gear tooth ratio of the planetary gear set 40.

As set forth above, the engagement schedule for the torque transmitting mechanisms is shown in the truth table of FIG. 1b. This truth table also provides an example of speed ratios that are available utilizing the ring gear/sun gear tooth ratios given by way of example in FIG. 1b. The R1/S1 value is the tooth ratio of the planetary gear set 20; the R2/S2 value is the tooth ratio of the planetary gear set 30; the R3/S3 value is the tooth ratio of the planetary gear set 40; and the R4/S4 value is the tooth ratio of the planetary gear set 50. Also, the chart of FIG. 1b describes the ratio steps that are attained utilizing the sample of tooth ratios given. For example, the step ratio between first and second forward speed ratios is 1.95, while the step ratio between the reverse and first forward ratio is −0.50. Those skilled in the art will recognize that since torque transmitting mechanisms 65 and 66 are connected to a common member, input clutch 62, and they are not engaged at the same time for any of the speed ratios, the pair can be executed as a double synchronizer to reduce content and cost. Similarly, torque transmitting mechanisms pair 70 and 72 can be implemented as a double synchronizer.

FIG. 2a shows a powertrain 110 having a conventional engine 12, a planetary transmission 114, and a conventional final drive mechanism 16. The planetary transmission 114 includes an input shaft 17 connected with the engine 12, a planetary gear arrangement 118, and an output shaft 19 connected with the final drive mechanism 16. The planetary gear arrangement 118 includes four planetary gear sets 120, 130, 140 and 150.

The planetary gear set 120 includes a sun gear member 122, a ring gear member 124, and a planet carrier assembly member 126. The planet carrier assembly member 126 includes a plurality of pinion gears 127 rotatably mounted on a carrier member 129 and disposed in meshing relationship with both the sun gear member 122 and the ring gear member 124.

The planetary gear set 130 includes a sun gear member 132, a ring gear member 134, and a planet carrier assembly member 136. The planet carrier assembly member 136 includes a plurality of pinion gears 137 rotatably mounted on a carrier member 139 and disposed in meshing relationship with both the sun gear member 132 and the ring gear member 134.

The planetary gear set 140 includes a sun gear member 142, a ring gear member 144, and a planet carrier assembly member 146. The planet carrier assembly member 146 includes a plurality of intermeshing pinion gears 147, 148 rotatably mounted on a carrier member 149 and disposed in meshing relationship with the ring gear member 144 and the sun gear member 142, respectively.

The planetary gear set 150 includes a sun gear member 152, a ring gear member 154, and a planet carrier assembly member 156. The planet carrier assembly member 156 includes a plurality of intermeshing pinion gears 157, 158 rotatably mounted on a carrier member 159 and disposed in meshing relationship with the ring gear member 154 and the sun gear member 152, respectively.

As a result of the dual clutch arrangement of the invention, the four planetary gear sets 120, 130, 140 and 150 are divided into first and second transmission subsets 160, 161 which are alternatively engaged to provide odd number and even number speed ranges, respectively. Transmission subset 160 includes planetary gear sets 120 and 130, and transmission subset 161 includes planetary gear sets 140 and 150. The output shaft 19 is continuously connected with members of both subsets 160 and 161.

As mentioned above, the first and second input clutches 162, 163 are alternatively engaged for transmitting power from the input shaft 17 to transmission subset 160 or transmission subset 161. The first and second input clutches 162, 163 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 160, 161 prior to engaging the respective input clutches 162, 163. The preselection is achieved by means of electronically controlled synchronizers. As shown, the planetary gear arrangement includes nine torque transmitting mechanisms 164, 165, 166, 167, 168, 169, 170, 171 and 172. The torque transmitting mechanism 164 comprises a braking synchronizer, and the torque transmitting mechanisms 165, 166, 167, 168, 169, 170, 171 and 172 comprise rotating synchronizers.

Accordingly, the input shaft 17 is alternately connected with the first and second transmission subsets 160, 161 (i.e. through the clutch 162 to synchronizers 165, 166, 167 and through clutch 163 to ring gear member 144). The ring gear member 124 is continuously connected with the sun gear member 132 through the interconnecting member 174. The planet carrier assembly member 146 is continuously connected with the ring gear member 134 and the output shaft 19 through the interconnecting member 176. The planet carrier assembly member 156 is continuously connected with the transmission housing 180.

The planet carrier assembly member 126 is selectively connectable with the transmission housing 180 through the braking synchronizer 164. The sun gear member 132 is selectively connectable with the input shaft 17 through the input clutch 162 and the rotating synchronizer 165. The sun gear member 122 is selectively connectable with the input shaft 17 through the input clutch 162 and the rotating synchronizer 166. The planet carrier assembly member 136 is selectively connectable with the input shaft 17 through the input clutch 162 and the rotating synchronizer 167. The planet carrier assembly member 126 is selectively connectable with the planet carrier assembly member 136 through the rotating synchronizer 168. The planet carrier assembly member 146 is selectively connectable with the ring gear member 154 through the rotating synchronizer 169. The planet carrier assembly member 146 is selectively connectable with the sun gear member 152 through the rotating synchronizer 170. The sun gear member 142 is selectively connectable with the ring gear member 154 through the rotating synchronizer 171. The sun gear member 142 is selectively connectable with the sun gear member 152 through the rotating synchronizer 172.

As shown in FIG. 2b, and in particular the truth table disclosed therein, the input clutches and torque transmitting mechanisms are selectively engaged in combinations of at least three to provide six forward speed ratios and a reverse speed ratio.

The reverse speed ratio is established with the engagement of the input clutch 162, the braking synchronizer 164 and the rotating synchronizers 165, 168. The input clutch 162 and the rotating synchronizer 165 connect the sun gear member 132 to the input shaft 17. The braking synchronizer 164 connects the planet carrier assembly member 126 to the transmission housing 180. The rotating synchronizer 168 connects the planet carrier assembly member 126 to the planet carrier assembly member 136. The sun gear member 132 rotates at the same speed as the input shaft 17. The planet carrier assembly members 126, 136 do not rotate. The ring gear member 134 and the planet carrier assembly member 146 rotate at the same speed as the output shaft 19. The ring gear member 134, and therefore the output shaft 19, rotates at a speed determined from the speed of the sun gear member 132 and the ring gear/sun gear tooth ratio of the planetary gear set 130.

The first forward speed ratio is established with the engagement of the input clutch 162, the braking synchronizer 164 and the rotating synchronizers 166, 168. The input clutch 162 and the rotating synchronizer 166 connect the sun gear member 122 to the input shaft 17. The braking synchronizer 164 connects the planet carrier assembly member 126 to the transmission housing 180. The rotating synchronizer 168 connects the planet carrier assembly member 126 to the planet carrier assembly member 136. The sun gear member 122 rotates at the same speed as the input shaft 17. The planet carrier assembly members 126, 136 do not rotate. The ring gear member 124 rotates at the same speed as the sun gear member 132. The ring gear member 124 rotates at a speed determined from the speed of the sun gear member 122 and the ring gear/sun gear tooth ratio of the planetary gear set 120. The ring gear member 134 and the planet carrier assembly member 146 rotate at the same speed as the output shaft 19. The ring gear member 134, and therefore the output shaft 19, rotates at a speed determined from the speed of the sun gear member 132 and the ring gear/sun gear tooth ratio of the planetary gear set 130. The numerical value of the first forward speed ratio is determined utilizing the ring gear/sun gear tooth ratios of the planetary gear sets 120, 130.

The second forward speed ratio is established with the engagement of the input clutch 163 and the rotating synchronizer 169, 172. The input clutch 163 connects the ring gear member 144 to the input shaft 17. The rotating synchronizer 169 connects the planet carrier assembly member 146 to the ring gear member 154. The rotating synchronizer 172 connects the sun gear member 142 to the sun gear member 152. The sun gear member 142 rotates at the same speed as the sun gear member 152. The planet carrier assembly member 146 and the ring gear member 154 rotate at the same speed as the output shaft 19. The ring gear member 144 rotates at the same speed as the input shaft 17. The planet carrier assembly member 146, and therefore the output shaft 19, rotates at a speed determined from the speed of the ring gear member 144, the speed of the sun gear member 142 and the ring gear/sun gear tooth ratio of the planetary gear set 140. The planet carrier assembly member 156 does not rotate. The ring gear member 154 rotates at a speed determined from the speed of the sun gear member 152 and the ring gear/sun gear tooth ratio of the planetary gear set 150. The numerical value of the second forward speed ratio is determined utilizing the ring gear/sun gear tooth ratios of the planetary gear sets 140, 150.

The third forward speed ratio is established with the engagement of the input clutch 162 and the rotating synchronizers 165, 167 and 168. In this configuration, the input shaft 17 is directly connected to the output shaft 19. The numerical value of the third forward speed ratio is 1.

The fourth forward speed ratio is established with the engagement of the input clutch 163 and the rotating synchronizers 170, 171. The input clutch 163 connects the ring gear member 144 to the input shaft 17. The rotating synchronizer 170 connects the planet carrier assembly member 146 to the sun gear member 152. The rotating synchronizer 171 connects the sun gear member 142 to the ring gear member 154. The sun gear member 142 rotates at the same speed as the ring gear member 154. The planet carrier assembly member 146 and the sun gear member 152 rotate at the same speed as the output shaft 19. The ring gear member 144 rotates at the same speed as the input shaft 17. The planet carrier assembly member 146, and therefore the output shaft 19, rotates at a speed determined from the speed of the ring gear member 144, the speed of the sun gear member 142 and the ring gear/sun gear tooth ratio of the planetary gear set 140. The planet carrier assembly member 156 does not rotate. The ring gear member 154 rotates at a speed determined from the speed of the sun gear member 152 and the ring gear/sun gear tooth ratio of the planetary gear set 150. The numerical value of the fourth forward speed ratio is determined utilizing the ring gear/sun gear tooth ratios of the planetary gear sets 140, 150.

The fifth forward speed ratio is established with the engagement of the input clutch 162, the braking synchronizer 164 and the rotating synchronizers 166, 167. The input clutch 162 and the rotating synchronizers 166, 167 connect the sun gear member 122 and the planet carrier assembly member 136 to the input shaft 17. The braking synchronizer 164 connects the planet carrier assembly member 126 to the transmission housing 180. The sun gear member 122 and the planet carrier assembly member 136 rotate at the same speed as the input shaft 17. The planet carrier assembly member 126 does not rotate. The ring gear member 124 rotates at the same speed as the sun gear member 132. The ring gear member 124 rotates at a speed determined from the speed of the sun gear member 122 and the ring gear/sun gear tooth ratio of the planetary gear set 120. The ring gear member 134 and the planet carrier assembly member 146 rotate at the same speed as the output shaft 19. The ring gear member 134, and therefore the output shaft 19, rotates at a speed determined from the speed of the planet carrier assembly member 136, the speed of the sun gear member 132 and the ring gear/sun gear tooth ratio of the planetary gear set 130. The numerical value of the fifth forward speed ratio is determined utilizing the ring gear/sun gear tooth ratios of the planetary gear sets 120, 130.

The sixth forward speed ratio is established with the engagement of the input clutch 163 and the rotating synchronizer 171, 172. The input clutch 163 connects the ring gear member 144 to the input shaft 17. The rotating synchronizer 171 connects the sun gear member 142 to the ring gear member 154. The rotating synchronizer 172 connects the sun gear member 142 to the sun gear member 152. The sun gear member 142 and the planetary gear set 150 do not rotate. The planet carrier assembly member 146 rotates at the same speed as the output shaft 19. The ring gear member 144 rotates at the same speed as the input shaft 17. The planet carrier assembly member 146, and therefore the output shaft 19, rotates at a speed determined from the speed of the ring gear member 144 and the ring gear/sun gear tooth ratio of the planetary gear set 140. The numerical value of the sixth forward speed ratio is determined utilizing the ring gear/sun gear tooth ratio of the planetary gear set 140.

As set forth above, the truth table of FIG. 2b describes the engagement sequence of the torque transmitting mechanisms utilized to provide a reverse drive ratio and six forward speed ratios. The truth table also provides an example of the ratios that can be attained with the family members shown in FIG. 2a utilizing the sample tooth ratios given in FIG. 2b. The R1/S1 value is the tooth ratio of the planetary gear set 120; the R2/S2 value is the tooth ratio of the planetary gear set 130; the R3/S3 value is the tooth ratio of the planetary gear set 140; and the R4/S4 value is the tooth ratio of the planetary gear set 150. Also shown in FIG. 2b are the ratio steps between single step ratios in the forward direction as well as the reverse to first ratio step. For example, the first to second step ratio is 1.66. Those skilled in the art will recognize that since torque transmitting mechanisms 165 and 166 are connected to a common member, input clutch 162, and they are not engaged at the same time for any of the speed ratios, the pair can be executed as a double synchronizer to reduce content and cost. Similarly, torque transmitting mechanisms pair 170 and 172 can be implemented as a double synchronizer.

Turning the FIG. 3a, a powertrain 210 having a conventional engine 12, a planetary transmission 214, and conventional final drive mechanism 16 is shown.

The planetary transmission 214 includes an input shaft 17 continuously connected with the engine 12, a planetary gear arrangement 218, and an output shaft 19 continuously connected with the final drive mechanism 16. The planetary gear arrangement 218 includes four planetary gear sets 220, 230, 240 and 250.

The planetary gear set 220 includes a sun gear member 222, a ring gear member 224, and a planet carrier assembly member 226. The planet carrier assembly member 226 includes a plurality of pinion gears 227 rotatably mounted on a carrier member 229 and disposed in meshing relationship with both the sun gear member 222 and the ring gear member 224.

The planetary gear set 230 includes a sun gear member 232, a ring gear member 234, and a planet carrier assembly member 236. The planet carrier assembly member 236 includes a plurality of pinion gears 237 rotatably mounted on a carrier member 239 and disposed in meshing relationship with both the sun gear member 232 and the ring gear member 234.

The planetary gear set 240 includes a sun gear member 242, a ring gear member 244, and a planet carrier assembly member 246. The planet carrier assembly member 246 includes a plurality of intermeshing pinion gears 247, 248 rotatably mounted on a carrier member 249 and disposed in meshing relationship with the ring gear member 244 and the sun gear member 242, respectively.

The planetary gear set 250 includes a sun gear member 252, a ring gear member 254, and a planet carrier assembly member 256. The planet carrier assembly member 256 includes a plurality of intermeshing pinion gears 257, 258 rotatably mounted on a carrier member 259 and disposed in meshing relationship with the ring gear member 254 and the sun gear member 252, respectively.

As a result of the dual clutch arrangement of the invention, the four planetary gear sets 220, 230, 240 and 250 are divided into first and second transmission subsets 260, 261 which are alternatively engaged to provide odd number and even number speed ranges, respectively. Transmission subset 260 includes planetary gear sets 220 and 230, and transmission subset 261 includes planetary gear sets 240 and 250. The output shaft 19 is continuously connected with members of both subsets 260 and 261.

As mentioned above, the first and second input clutches 262, 263 are alternatively engaged for transmitting power from the input shaft 17 to transmission subset 260 or transmission subset 261. The first and second input clutches 262, 263 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 260, 261 prior to engaging the respective input clutches 262, 263. The preselection is achieved by means of electronically controlled synchronizers. As shown, the planetary gear arrangement includes nine torque transmitting mechanisms 264, 265, 266, 267, 268, 269, 270, 271 and 272. The torque transmitting mechanism 264 comprises a braking synchronizer, and the torque transmitting mechanisms 265, 266, 267, 268, 269, 270, 271 and 272 comprise rotating synchronizers.

Accordingly, the input shaft 17 is alternately connected with the first and second transmission subsets 260, 261 (i.e. through clutch 262 to synchronizers 265, 266, 267 and through clutch 263 to ring gear member 244). The ring gear member 224 is continuously connected with the sun gear member 232 through the interconnecting member 274. The planet carrier assembly member 246 is continuously connected with the ring gear member 234 and the output shaft 19 through the interconnecting member 276. The sun gear member 252 is continuously connected with the transmission housing 280.

The planet carrier assembly member 226 is selectively connectable with the transmission housing 280 through the braking synchronizer 264. The sun gear member 232 is selectively connectable with the input shaft 17 through the input clutch 262 and the rotating synchronizer 265. The sun gear member 222 is selectively connectable with the input shaft 17 through the input clutch 262 and the rotating synchronizer 266. The planet carrier assembly member 236 is selectively connectable with the input shaft 17 through the input clutch 262 and the rotating synchronizer 267. The planet carrier assembly member 226 is selectively connectable with the planet carrier assembly member 236 through the rotating synchronizer 268. The planet carrier assembly member 246 is selectively connectable with the ring gear member 254 through the rotating synchronizer 269. The planet carrier assembly member 246 is selectively connectable with the planet carrier assembly member 256 through the rotating synchronizer 270. The sun gear member 242 is selectively connectable with the ring gear member 254 through the rotating synchronizer 271. The sun gear member 242 is selectively connectable with the planet carrier assembly member 256 through the rotating synchronizer 272.

As shown in FIG. 3b, and in particular the truth table disclosed therein, the input clutches and torque transmitting mechanisms are selectively engaged in combinations of at least three to provide six forward speed ratios and a reverse speed ratio.

The reverse speed ratio is established with the engagement of the input clutch 262, the braking synchronizer 264 and the rotating synchronizers 265, 268. The input clutch 262 and the rotating synchronizer 265 connect the sun gear member 232 to the input shaft 17. The braking synchronizer 264 connects the planet carrier assembly member 226 to the transmission housing 280. The rotating synchronizer 268 connects the planet carrier assembly member 226 to the planet carrier assembly member 236. The ring gear member 224 and the sun gear member 232 rotate at the same speed as the input shaft 17. The planet carrier assembly members 226, 236 do not rotate. The ring gear member 234 and the planet carrier assembly member 246 rotate at the same speed as the output shaft 19. The ring gear member 234, and therefore the output shaft 19, rotates at a speed determined from the speed of the sun gear member 232 and the ring gear/sun gear tooth ratio of the planetary gear set 230. The numerical value of the reverse speed ratio is determined utilizing the ring gear/sun gear tooth ratio of the planetary gear set 230.

The first forward speed ratio is established with the engagement of the input clutch 262, the braking synchronizer 264 and the rotating synchronizers 266, 268. The input clutch 262 and the rotating synchronizer 266 connect the sun gear member 222 to the input shaft 17. The braking synchronizer 264 connects the sun gear member 226 to the transmission housing 280. The rotating synchronizer 268 connects the planet carrier assembly member 226 to the planet carrier assembly member 236. The sun gear member 222 rotates at the same speed as the input shaft 17. The planet carrier assembly members 226, 236 do not rotate. The ring gear member 224 rotates at the same speed as the sun gear member 232. The ring gear member 224 rotates at a speed determined from the speed of the sun gear member 222 and the ring gear/sun gear tooth ratio of the planetary gear set 220. The ring gear member 234 and the planet carrier assembly member 246 rotate at the same speed as the output shaft 19. The ring gear member 234, and therefore the output shaft 19, rotates at a speed determined from the speed of the sun gear member 232 and the ring gear/sun gear tooth ratio of the planetary gear set 230. The numerical value of the first forward speed ratio is determined utilizing the ring gear/sun gear tooth ratios of the planetary gear sets 220, 230.

The second forward speed ratio is established with the engagement of the input clutch 263 and the rotating synchronizers 269, 272. The input clutch 263 connects the ring gear member 244 to the input shaft 17. The rotating synchronizer 269 connects the planet carrier assembly member 246 to the ring gear member 254. The rotating synchronizer 272 connects the sun gear member 242 to the planet carrier assembly member 256. The sun gear member 242 rotates at the same speed as the planet carrier assembly member 256. The planet carrier assembly member 246 and the ring gear member 254 rotate at the same speed as the output shaft 19. The ring gear member 244 rotates at the same speed as the input shaft 17. The planet carrier assembly member 246, and therefore the output shaft 19, rotates at a speed determined from the speed of the ring gear member 244, the speed of the sun gear member 242 and the ring gear/sun gear tooth ratio of the planetary gear set 240. The sun gear member 252 does not rotate. The planet carrier assembly member 256 rotates at a speed determined from the speed of the ring gear member 254 and the ring gear/sun gear tooth ratio of the planetary gear set 250. The numerical value of the second forward speed ratio is determined utilizing the ring gear/sun gear tooth ratios of the planetary gear set 240, 250.

The third forward speed ratio is established with the engagement of the input clutch 262 and the rotating synchronizers 265, 267 and 268. In this configuration, the input shaft 17 is directly connected to the output shaft 19. The numerical value of the third forward speed ratio is 1.

The fourth forward speed ratio is established with the engagement of the input clutch 263 and the rotating synchronizers 270, 271. The input clutch 263 connects the ring gear member 244 to the input shaft 17. The rotating synchronizer 270 connects the planet carrier assembly member 246 to the planet carrier assembly member 256. The rotating synchronizer 271 connects the sun gear member 242 to the ring gear member 254. The sun gear member 242 rotates at the same speed as the ring gear member 254. The planet carrier assembly members 246, 256 rotate at the same speed as the output shaft 19. The ring gear member 244 rotates at the same speed as the input shaft 17. The planet carrier assembly member 246, and therefore the output shaft 19, rotates at a speed determined from the speed of the ring gear member 244, the speed of the sun gear member 242 and the ring gear/sun gear tooth ratio of the planetary gear set 240. The sun gear member 252 does not rotate. The planet carrier assembly member 256 rotates at a speed determined from the speed of the ring gear member 254 and the ring gear/sun gear tooth ratio of the planetary gear set 250. The numerical value of the fourth forward speed ratio is determined utilizing the ring gear/sun gear tooth ratios of the planetary gear sets 240, 250.

The fifth forward speed ratio is established with the engagement of the input clutch 262, the braking synchronizer 264 and the rotating synchronizers 266, 267. The input clutch 262 and the rotating synchronizers 266, 267 connect the sun gear member 222 and the planet carrier assembly member 236 to the input shaft 17. The braking synchronizer 264 connects the planet carrier assembly member 226 to the transmission housing 280. The sun gear member 222 and the planet carrier assembly member 236 rotate at the same speed as the input shaft 17. The planet carrier assembly member 226 does not rotate. The ring gear member 224 rotates at the same speed as the sun gear member 232. The ring gear member 224 rotates at a speed determined from the speed of the sun gear member 222 and the ring gear/sun gear tooth ratio of the planetary gear set 220. The ring gear member 234 and the planet carrier assembly member 246 rotate at the same speed as the output shaft 19. The ring gear member 234, and therefore the output shaft 19, rotates at a speed determined from the speed of the planet carrier assembly member 236, the speed of the sun gear member 232 and the ring gear/sun gear tooth ratio of the planetary gear set 230. The numerical value of the fifth forward speed ratio is determined utilizing the ring gear/sun gear tooth ratios of the planetary gear sets 220, 230.

The sixth forward speed ratio is established with the engagement of the input clutch 263 and the rotating synchronizers 271, 272. The input clutch 263 connects the ring gear member 244 to the input shaft 17. The rotating synchronizer 271 connects the sun gear member 242 to the ring gear member 254. The rotating synchronizer 272 connects the sun gear member 242 to the planet carrier assembly member 256. The sun gear member 242 and the planetary gear set 250 do not rotate. The planet carrier assembly member 246 rotates at the same speed as the output shaft 19. The ring gear member 244 rotates at the same speed as the input shaft 17. The planet carrier assembly member 246, and therefore the output shaft 19, rotates at a speed determined from the speed of the ring gear member 244 and the ring gear/sun gear tooth ratio of the planetary gear set 240. The numerical value of the sixth forward speed ratio is determined utilizing the ring gear/sun gear tooth ratio of the planetary gear set 240.

As previously set forth, the truth table of FIG. 3b describes the combinations of engagements utilized for six forward speed ratios and one reverse speed ratio. The truth table also provides an example of speed ratios that are available with the family member described above. These examples of speed ratios are determined the tooth ratios given in FIG. 3b. The R1/S1 value is the tooth ratio of the planetary gear set 220; the R2/S2 value is the tooth ratio of the planetary gear set 230; the R3/S3 value is the tooth ratio of the planetary gear set 240; and the R4/S4 value is the tooth ratio of the planetary gear set 250. Also depicted in FIG. 3b is a chart representing the ratio steps between adjacent forward speed ratios and the reverse speed ratio. For example, the first to second ratio interchange has a step of 1.82.

A powertrain 310, shown in FIG. 4a, includes the engine 12, a planetary transmission 314, and the final drive mechanism 16. The planetary transmission 314 includes an input shaft 17 continuously connected with the engine 12, a planetary gear arrangement 318, and an output shaft 19 continuously connected with the final drive mechanism 16. The planetary gear arrangement 318 includes four planetary gear sets 320, 330, 340 and 350.

The planetary gear set 320 includes a sun gear member 322, a ring gear member 324, and a planet carrier assembly member 326. The planet carrier assembly member 326 includes a plurality of pinion gears 327 rotatably mounted on a carrier member 329 and disposed in meshing relationship with both the sun gear member 322 and the ring gear member 324.

The planetary gear set 330 includes a sun gear member 332, a ring gear member 334, and a planet carrier assembly member 336. The planet carrier assembly member 336 includes a plurality of pinion gears 337 rotatably mounted on a carrier member 339 and disposed in meshing relationship with both the sun gear member 332 and the ring gear member 334.

The planetary gear set 340 includes a sun gear member 342, a ring gear member 344, and a planet carrier assembly member 346. The planet carrier assembly member 346 includes a plurality of intermeshing pinion gears 347, 348 rotatably mounted on a carrier member 349 and disposed in meshing relationship with the ring gear member 344 and the sun gear member 342, respectively.

The planetary gear set 350 includes a sun gear member 352, a ring gear member 354, and a planet carrier assembly member 356. The planet carrier assembly member 356 includes a plurality of intermeshing pinion gears 357, 358 rotatably mounted on a carrier member 359 and disposed in meshing relationship with the ring gear member 354 and the sun gear member 352, respectively.

As a result of the dual clutch arrangement of the invention, the four planetary gear sets 320, 330, 340 and 350 are divided into first and second transmission subsets 360, 361 which are alternatively engaged to provide odd number and even number speed ranges, respectively. Transmission subset 360 includes planetary gear sets 320 and 330, and transmission subset 361 includes planetary gear sets 340 and 350. The output shaft 19 is continuously connected with members of both subsets 360 and 361.

As mentioned above, the first and second input clutches 362, 363 are alternatively engaged for transmitting power from the input shaft 17 to transmission subset 360 or transmission subset 361. The first and second input clutches 362, 363 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 360, 361 prior to engaging the respective input clutches 362, 363. The preselection is achieved by means of electronically controlled synchronizers. As shown, the planetary gear arrangement includes nine torque transmitting mechanisms 364, 365, 366, 367, 368, 369, 370, 371 and 372. The torque transmitting mechanism 364 comprises a braking synchronizer, and the torque transmitting mechanisms 365, 366, 367, 368, 369, 370, 371 and 372 comprise rotating synchronizers.

Accordingly, the input shaft 17 is alternately connected with the first and second transmission subsets 360, 361 (i.e. through clutch 362 to synchronizers 365, 366, 367 and through clutch 363 to ring gear member 344). The ring gear member 324 is continuously connected with the sun gear member 332 through the interconnecting member 374. The planet carrier assembly member 346 is continuously connected with the ring gear member 334 and the output shaft 19 through the interconnecting member 376. The planet carrier assembly member 356 is continuously connected with the transmission housing 380.

The planet carrier assembly member 326 is selectively connectable with the transmission housing 380 through the braking synchronizer 364. The sun gear member 332 is selectively connectable with the input shaft 17 through the input clutch 362 and the rotating synchronizer 365. The sun gear member 322 is selectively connectable with the input shaft 17 through the input clutch 362 and the rotating synchronizer 366. The planet carrier assembly member 336 is selectively connectable with the input shaft 17 through the input clutch 362 and the rotating synchronizer 367. The planet carrier assembly member 326 is selectively connectable with the planet carrier assembly member 336 through the rotating synchronizer 368. The planet carrier assembly member 346 is selectively connectable with the ring gear member 354 through the rotating synchronizer 369. The planet carrier assembly member 346 is selectively connectable with the sun gear member 352 through the rotating synchronizer 370. The sun gear member 342 is selectively connectable with the ring gear member 354 through the rotating synchronizer 371. The sun gear member 342 is selectively connectable with the sun gear member 352 through the rotating synchronizer 372.

The truth tables given in FIGS. 4b, 5b, 6b, 7b, 8b and 9b show the engagement sequences for the torque transmitting mechanisms to provide at least five forward speed ratios and one reverse speed ratio. As shown and described above for the configurations in FIGS. 1a, 2a and 3a, those skilled in the art will understand from the respective truth tables how the speed ratios are established through the planetary gear sets identified in the written description.

The truth table shown in FIG. 4b describes the engagement combination and engagement sequence necessary to provide the reverse drive ratio and six forward speed ratios. A sample of the numerical values for the ratios is also provided in the truth table of FIG. 4b. These values are determined utilizing the ring gear/sun gear tooth ratios also given in FIG. 4b. The R1/S1 value is the tooth ratio for the planetary gear set 320; the R2/S2 value is the tooth ratio for the planetary gear set 330; the R3/S3 value is the tooth ratio for the planetary gear set 340; and the R4/S4 value is the tooth ratio for the planetary gear set 350. Also given in FIG. 4b is a chart describing the step ratios between the adjacent forward speed ratios and the reverse to first forward speed ratio. For example, the first to second forward speed ratio step is 2.02.

Those skilled in the art will recognize that the numerical value of the reverse speed ratio is determined utilizing the ring gear/sun gear tooth ratio of the planetary gear set 330. The numerical values of the first and fifth forward speed ratios are determined utilizing the ring gear/sun gear tooth ratios of the planetary gear sets 320, 330. The numerical values of the second and fourth forward speed ratios are determined utilizing the ring gear/sun gear tooth ratios of the planetary gear sets 340, 350. The numerical value of the third forward speed ratio is 1. The numerical value of the sixth forward speed ratio is determined utilizing the ring gear/sun gear tooth ratio of the planetary gear set 340.

Figures 5A, 5B:
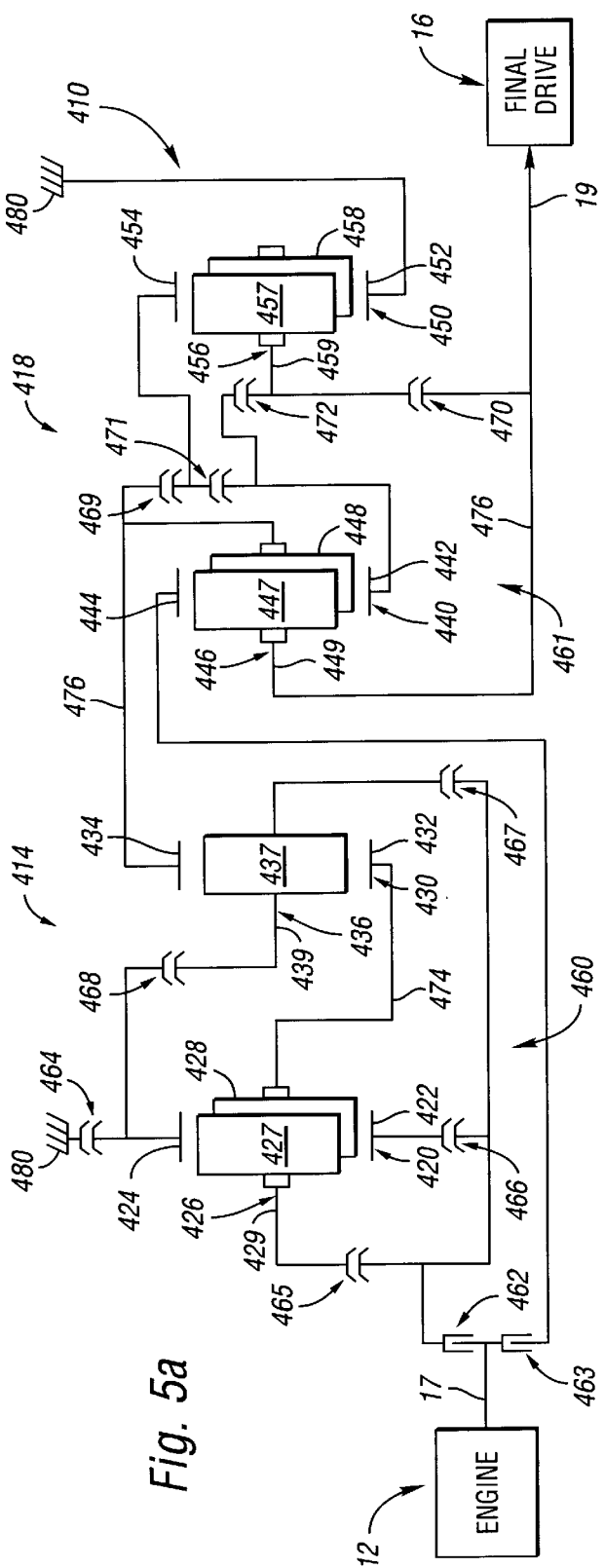

A powertrain 410 shown in FIG. 5a includes a conventional engine 12, a planetary transmission 414, and a conventional final drive mechanism 16. The planetary transmission 414 includes an input shaft 17 connected with the engine 12, a planetary gear arrangement 418, and an output shaft 19 continuously connected with the final drive mechanism 16. The planetary gear arrangement 418 includes four planetary gear sets 420, 430, 440 and 450.

The planetary gear set 420 includes a sun gear member 422, a ring gear member 424, and a planet carrier assembly member 426. The planet carrier assembly member 426 includes a plurality of intermeshing pinion gears 427, 428 rotatably mounted on a carrier member 429 and disposed in meshing relationship with the ring gear member 424 and the sun gear member 422, respectively.

The planetary gear set 430 includes a sun gear member 432, a ring gear member 434, and a planet carrier assembly member 436. The planet carrier assembly member 436 includes a plurality of pinion gears 437 rotatably mounted on a carrier member 439 and disposed in meshing relationship with both the sun gear member 432 and the ring gear member 434.

The planetary gear set 440 includes a sun gear member 442, a ring gear member 444, and a planet carrier assembly member 446. The planet carrier assembly member 446 includes a plurality of intermeshing pinion gears 447, 448 rotatably mounted on a carrier member 449 and disposed in meshing relationship with the ring gear member 444 and the sun gear member 442, respectively.

The planetary gear set 450 includes a sun gear member 452, a ring gear member 454, and a planet carrier assembly member 456. The planet carrier assembly member 456 includes a plurality of intermeshing pinion gears 457, 458 rotatably mounted on a carrier member 459 and disposed in meshing relationship with the ring gear member 454 and the sun gear member 452, respectively.

As a result of the dual clutch arrangement of the invention, the four planetary gear sets 420, 430, 440 and 450 are divided into first and second transmission subsets 460, 461 which are alternatively engaged to provide odd number and even number speed ranges, respectively. Transmission subset 460 includes planetary gear sets 420 and 430, and transmission subset 461 includes planetary gear sets 440 and 450. The output shaft 19 is continuously connected with members of both subsets 460 and 461.

As mentioned above, the first and second input clutches 462, 463 are alternatively engaged for transmitting power from the input shaft 17 to transmission subset 460 or transmission subset 461. The first and second input clutches 462, 463 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 460, 461 prior to engaging the respective input clutches 462, 463. The preselection is achieved by means of electronically controlled synchronizers. As shown, the planetary gear arrangement includes nine torque transmitting mechanisms 464, 465, 466, 467, 468, 469, 470, 471 and 472. The torque transmitting mechanisms 464 comprises a braking synchronizer, and the torque transmitting mechanisms 465, 466, 467, 468, 469, 470, 471 and 472 comprise rotating synchronizers.

Accordingly, the input shaft 17 is alternately connected with the first and second transmission subsets 460, 461 (i.e. through clutch 462 to synchronizers 465, 466, 467 and through clutch 463 to ring gear member 444). The planet carrier assembly member 426 is continuously connected with the sun gear member 432 through the interconnecting member 474. The planet carrier assembly member 446 is continuously connected with the ring gear member 434 and the output shaft 19 through the interconnecting member 476. The sun gear member 452 is continuously connected with the transmission housing 480.

The ring gear member 424 is selectively connectable with the transmission housing 480 through the braking synchronizer 464. The planet carrier assembly member 426 is selectively connectable with the input shaft 17 through the input clutch 462 and the rotating synchronizer 465. The sun gear member 422 is selectively connectable with the input shaft 17 through the input clutch 462 and the rotating synchronizer 466. The planet carrier assembly member 436 is selectively connectable with the input shaft 17 through the input clutch 462 and the rotating synchronizer 467. The ring gear member 424 is selectively connectable with the planet carrier assembly member 436 through the rotating synchronizer 468. The planet carrier assembly member 446 is selectively connectable with the ring gear member 454 through the rotating synchronizer 469. The planet carrier assembly member 446 is selectively connectable with the planet carrier assembly member 456 through the rotating synchronizer 470. The sun gear member 442 is selectively connectable with the ring gear member 454 through the rotating synchronizer 471. The sun gear member 442 is selectively connectable with the planet carrier assembly member 456 through the rotating synchronizer 472.

As shown in FIG. 5b, and in particular the truth table disclosed therein, the input clutches and torque transmitting mechanisms are selectively engaged in combinations of at least three to provide six forward speed ratios and a reverse speed ratio.

FIG. 5b also provides a chart of the ratio steps between adjacent forward ratios and between the reverse and first ratio. For example, the ratio step between the first and second forward ratios is 1.75. Those skilled in the art will recognize that the numerical value of the reverse speed ratio is determined utilizing the ring gear/sun gear tooth ratio of the planetary gear set 430. The numerical values of the first and fifth forward speed ratios are determined utilizing the ring gear/sun gear tooth ratios of the planetary gear sets 420, 430. The numerical values of the second and fourth forward speed ratios are determined utilizing the ring gear/sun gear tooth ratios of the planetary gear sets 440, 450. The numerical value of the third forward speed ratio is 1. The numerical value of the sixth forward speed ratio is determined utilizing the ring gear/sun gear tooth ratio of the planetary gear set 440.

Figures 6A, 6B:
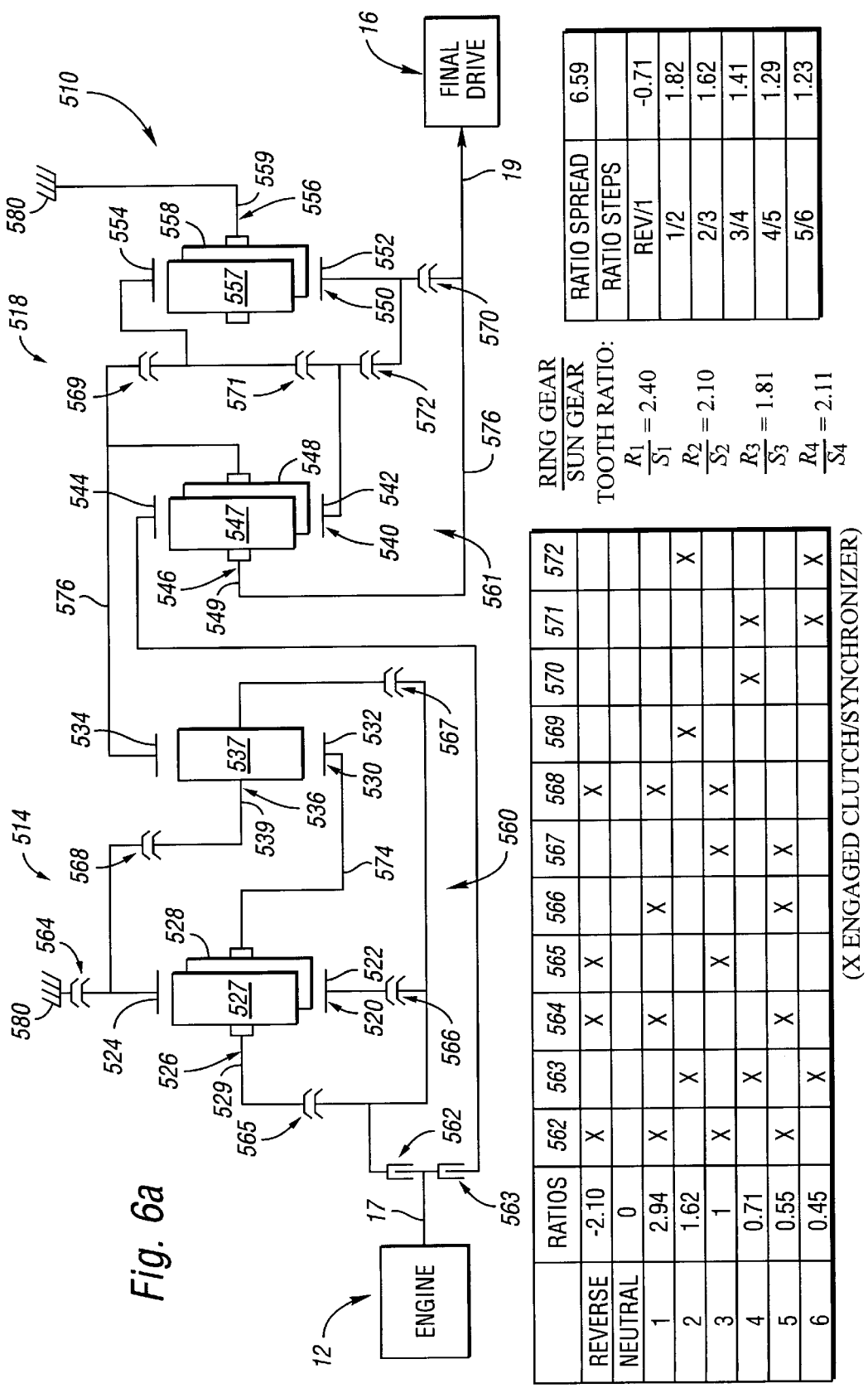

A powertrain 510, shown in FIG. 6a, includes a conventional engine 12, a powertrain 514, and a conventional final drive mechanism 16. The powertrain 514 includes an input shaft 17 connected with the engine 12, a planetary gear arrangement 518, and an output shaft 19 continuously connected with the final drive mechanism 16. The planetary gear arrangement 518 includes four planetary gear sets 520, 530, 540 and 550.

The planetary gear set 520 includes a sun gear member 522, a ring gear member 524, and a planet carrier assembly member 526. The planet carrier assembly member 526 includes a plurality of intermeshing pinion gears 527, 528 rotatably mounted on a carrier member 529 and disposed in meshing relationship with the ring gear member 524 and the sun gear member 522, respectively.

The planetary gear set 530 includes a sun gear member 532, a ring gear member 534, and a planet carrier assembly member 536. The planet carrier assembly member 536 includes a plurality of pinion gears 537 rotatably mounted on a carrier member 539 and disposed in meshing relationship with both the sun gear member 532 and the ring gear member 534.

The planetary gear set 540 includes a sun gear member 542, a ring gear member 544, and a planet carrier assembly member 546. The planet carrier assembly member 546 includes a plurality of intermeshing pinion gears 547, 548 rotatably mounted on a carrier member 549 and disposed in meshing relationship with the ring gear member 544 and the sun gear member 542, respectively.

The planetary gear set 550 includes a sun gear member 552, a ring gear member 554, and a planet carrier assembly member 556. The planet carrier assembly member 556 includes a plurality of intermeshing pinion gears 557, 558 rotatably mounted on a carrier member 559 and disposed in meshing relationship with the ring gear member 554 and the sun gear member 552, respectively.

As a result of the dual clutch arrangement of the invention, the four planetary gear sets 520, 530, 540 and 550 are divided into first and second transmission subsets 560, 561 which are alternatively engaged to provide odd number and even number speed ranges, respectively. Transmission subset 560 includes planetary gear sets 520 and 530, and transmission subset 561 includes planetary gear sets 540 and 550. The output shaft 19 is continuously connected with members of both subsets 560 and 561.

As mentioned above, the first and second input clutches 562, 563 are alternatively engaged for transmitting power from the input shaft 17 to transmission subset 560 or transmission subset 561. The first and second input clutches 562, 563 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 560, 561 prior to engaging the respective input clutches 562, 563. The preselection is achieved by means of electronically controlled synchronizers. As shown, the planetary gear arrangement includes nine torque transmitting mechanisms 564, 565, 566, 567, 568, 569, 570, 571 and 572. The torque transmitting mechanisms 564 comprises a braking synchronizer, and the torque transmitting mechanisms 565, 566, 567, 568, 569, 570, 571 and 572 comprise rotating synchronizers.

Accordingly, the input shaft 17 is alternately connected with the first and second transmission subsets 560, 561 (i.e.

through clutch 562 to synchronizers 565, 566, 567 and through clutch 563 to ring gear member 544). The planet carrier assembly member 526 is continuously connected with the sun gear member 532 through the interconnecting member 574. The planet carrier assembly member 546 is continuously connected with the ring gear member 534 and the output shaft 19 through the interconnecting member 576. The planet carrier assembly member 556 is continuously connected with the transmission housing 580.

The ring gear member 524 is selectively connectable with the transmission housing 580 through the braking synchronizer 564. The planet carrier assembly member 526 is selectively connectable with the input shaft 17 through the input clutch 562 and the rotating synchronizer 565. The sun gear member 522 is selectively connectable with the input shaft 17 through the input clutch 562 and the rotating synchronizer 566. The planet carrier assembly member 536 is selectively connectable with the input shaft 17 through the input clutch 562 and the rotating synchronizer 567. The sun gear member 524 is selectively connectable with the planet carrier assembly member 536 through the rotating synchronizer 568. The planet carrier assembly member 546 is selectively connectable with the ring gear member 554 through the rotating synchronizer 569. The planet carrier assembly member 546 is selectively connectable with the sun gear member 552 through the rotating synchronizer 570. The sun gear member 542 is selectively connectable with the ring gear member 554 through the rotating synchronizer 571. The sun gear member 542 is selectively connectable with the sun gear member 552 through the rotating synchronizer 572.

As shown in FIG. 6b, and in particular the truth table disclosed therein, the input clutches and torque transmitting mechanisms are selectively engaged in combinations of at least three to provide six forward speed ratios and a reverse speed ratio. The chart of FIG. 6b describes the ratio steps between adjacent forward speed ratios and the ratio step between the reverse and first forward speed ratio.

Those skilled in the art, upon reviewing the truth table and the schematic representation of FIG. 6a can determine that the numerical value of the reverse speed ratio is determined utilizing the ring gear/sun gear tooth ratio of the planetary gear set 530. The numerical values of the first and fifth forward speed ratios are determined utilizing the ring gear/sun gear tooth ratios of the planetary gear sets 520, 530. The numerical values of the second and fourth forward speed ratios are determined utilizing the ring gear/sun gear tooth ratios of the planetary gear sets 540, 550. The numerical value of the third forward speed ratio is 1. The numerical value of the sixth forward speed ratio is determined utilizing the ring gear/sun gear tooth ratio of the planetary gear set 540.

The sample speed ratios given in the truth table are determined utilizing the tooth ratio values also given in FIG. 6b. R1/S1 value is the tooth ratio of the planetary gear set 520; the R2/S2 value is the tooth ratio of the planetary gear set 530; the R3/S3 value is the tooth ratio of the planetary gear set 540; and the R4/S4 value is the tooth ratio of the planetary gear set 550.

Figures 7A, 7B:
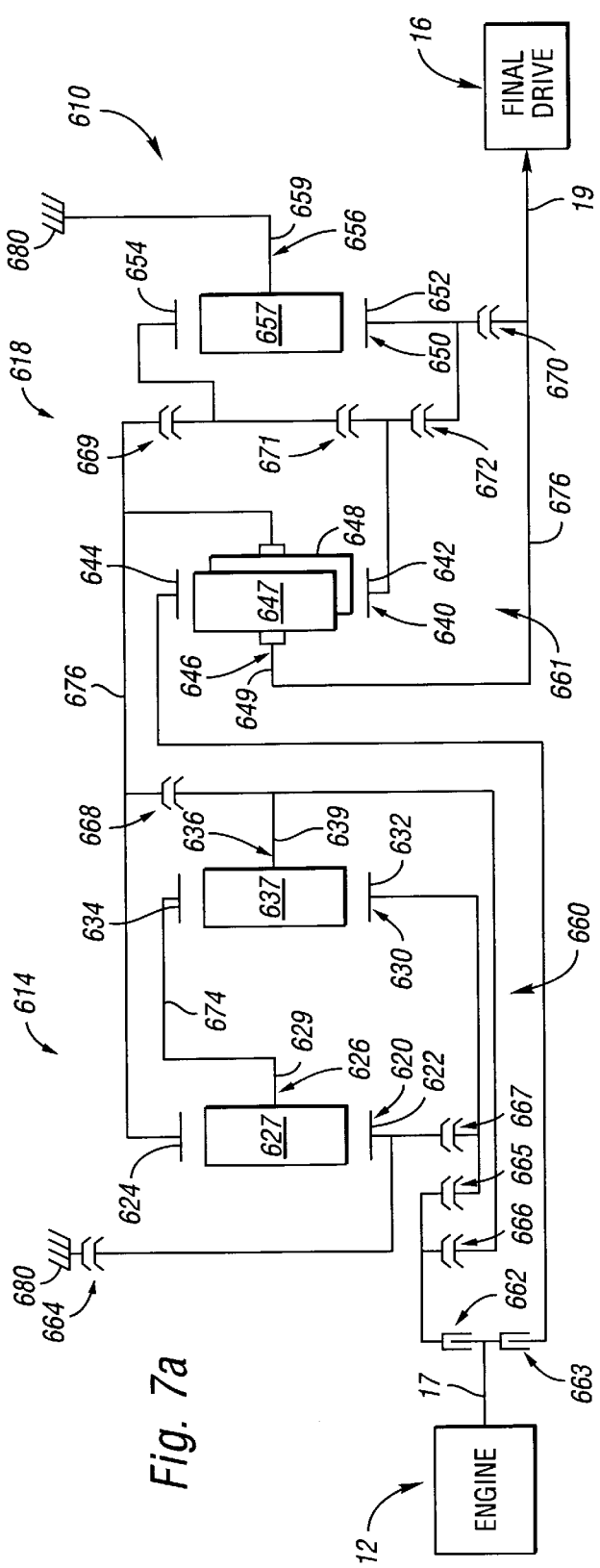

A powertrain 610, shown in FIG. 7a, has the engine 12, a planetary transmission 614, and the final drive mechanism 16. The planetary transmission 614 includes the input shaft 17, a planetary gear arrangement 618, and the output shaft 19. The planetary gear arrangement 618 includes four planetary gear sets 620, 630, 640 and 650.

The planetary gear set 620 includes a sun gear member 622, a ring gear member 624, and a planet carrier assembly member 626. The planet carrier assembly member 626 includes a plurality of pinion gears 627 rotatably mounted on a carrier member 629 and disposed in meshing relationship with both the sun gear member 622 and the ring gear member 624.

The planetary gear set 630 includes a sun gear member 632, a ring gear member 634, and a planet carrier assembly member 636. The planet carrier assembly member 636 includes a plurality of pinion gears 637 rotatably mounted on a carrier member 639 and disposed in meshing relationship with both the sun gear member 632 and the ring gear member 634.

The planetary gear set 640 includes a sun gear member 642, a ring gear member 644, and a planet carrier assembly member 646. The planet carrier assembly member 646 includes a plurality of intermeshing pinion gears 647, 648 rotatably mounted on a carrier member 649 and disposed in meshing relationship with the ring gear member 644 and the sun gear member 642, respectively.

The planetary gear set 650 includes a sun gear member 652, a ring gear member 654, and a planet carrier assembly member 656. The planet carrier assembly member 656 includes a plurality of pinion gears 657 rotatably mounted on a carrier member 659 and disposed in meshing relationship with both the sun gear member 652 and the ring gear member 654.

As a result of the dual clutch arrangement of the invention, the four planetary gear sets 620, 630, 640 and 650 are divided into first and second transmission subsets 660, 661 which are alternatively engaged to provide odd number and even number speed ranges, respectively. Transmission subset 660 includes planetary gear sets 620 and 630, and transmission subset 661 includes planetary gear sets 640 and 650. The output shaft 19 is continuously connected with members of both subsets 660 and 661.

As mentioned above, the first and second input clutches 662, 663 are alternatively engaged for transmitting power from the input shaft 17 to transmission subset 660 or transmission subset 661. The first and second input clutches 662, 663 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 660, 661 prior to engaging the respective input clutches 662, 663. The preselection is achieved by means of electronically controlled synchronizers. As shown, the planetary gear arrangement includes nine torque transmitting mechanisms 664, 665, 666, 667, 668, 669, 670, 671 and 672. The torque transmitting mechanism 664 comprises a braking synchronizer, and the torque transmitting mechanisms 665, 666, 667, 668, 669, 670, 671 and 672 comprise rotating synchronizers.

Accordingly, the input shaft 17 is alternately connected with the first and second transmission subsets 660, 661 (i.e. through clutch 662 to synchronizers 665, 666, and through clutch 663 to ring gear member 644). The planet carrier assembly member 626 is continuously connected with the ring gear member 634 through the interconnecting member 674. The planet carrier assembly member 646 is continuously connected with the ring gear member 624 and the output shaft 19 through the interconnecting member 676. The planet carrier assembly member 656 is continuously connected with the transmission housing 680.

The sun gear member 622 is selectively connectable with the transmission housing 680 through the braking synchronizer 664. The sun gear member 632 is selectively connectable with the input shaft 17 through the input clutch 662 and the rotating synchronizer 665. The planet carrier assembly member 636 is selectively connectable with the input shaft 17 through the input clutch 662 and the rotating synchronizer 666. The sun gear member 622 is selectively connectable with the sun gear member 632 through the rotating synchronizer 667. The ring gear member 624 is selectively connectable with the planet carrier assembly member 636 through the rotating synchronizer 668. The planet carrier assembly member 646 is selectively connectable with the ring gear member 654 through the rotating synchronizer 669. The planet carrier assembly member 646 is selectively connectable with the sun gear member 652 through the rotating synchronizer 670. The sun gear member 642 is selectively connectable with the ring gear member 654 through the rotating synchronizer 671. The sun gear member 642 is selectively connectable with the sun gear member 652 through the rotating synchronizer 672.

As shown in FIG. 7b, and in particular the truth table disclosed therein, the input clutches and torque transmitting mechanisms are selectively engaged in combinations of at least three to provide six forward speed ratios and a reverse speed ratio. The ratio values given are by way example and are established utilizing the ring gear/sun gear tooth ratios given in FIG. 7b. For example, the R1/S2 value is the tooth ratio of the planetary gear set 620; the R2/S2 value is the tooth ratio of the planetary gear set 630; the R3/S3 value is the tooth ratio of the planetary gear set 640; and the R4/S4 value is the tooth ratio of the planetary gear set 650. The ratio steps between adjacent forward ratios and the reverse to first ratio are also given in FIG. 7b.

Those skilled in the art will, upon reviewing the truth table of FIG. 7b, recognize that the numerical values of the reverse and the sixth forward speed ratios are determined utilizing the ring gear/sun gear tooth ratios of the planetary gear sets 640, 650. The numerical values of the first and fifth forward speed ratios are determined utilizing the ring gear/sun gear tooth ratios of the planetary gear sets 620, 630. The numerical value of the second forward speed ratio is 1. The numerical value of the third forward speed ratio is determined utilizing the ring gear/sun gear tooth ratio of the planetary gear set 620. The numerical value of the fourth forward speed ratio is determined utilizing the ring gear/sun gear tooth ratio of the planetary gear set 640.

A powertrain 710, shown in FIG. 8a, has the conventional engine 12, a planetary transmission 714, and the conventional final drive mechanism 16. The engine 12 is continuously connected with the input shaft 17. The planetary transmission 714 is drivingly connected with the final drive mechanism 16 through the output shaft 19. The planetary transmission 714 includes a planetary gear arrangement 718 that has a first planetary gear set 720, a second planetary gear set 730, a third planetary gear set 740, and a fourth planetary gear set 750.

The planetary gear set 720 includes a sun gear member 722, a ring gear member 724, and a planet carrier assembly member 726. The planet carrier assembly member 726 includes a plurality of pinion gears 727 rotatably mounted on a carrier member 729 and disposed in meshing relationship with both the sun gear member 722 and the ring gear member 724.

The planetary gear set 730 includes a sun gear member 732, a ring gear member 734, and a planet carrier assembly member 736. The planet carrier assembly member 736 includes a plurality of pinion gears 737 rotatably mounted on a carrier member 739 and disposed in meshing relationship with both the sun gear member 732 and the ring gear member 734.

The planetary gear set 740 includes a sun gear member 742, a ring gear member 744, and a planet carrier assembly member 746. The planet carrier assembly member 746 includes a plurality of intermeshing pinion gears 747, 748 rotatably mounted on a carrier member 749 and disposed in meshing relationship with the ring gear member 744 and the sun gear member 742, respectively.

The planetary gear set 750 includes a sun gear member 752, a ring gear member 754, and a planet carrier assembly member 756. The planet carrier assembly member 756 includes a plurality of pinion gears 757 rotatably mounted on a carrier member 759 and disposed in meshing relationship with both the sun gear member 752 and the ring gear member 754.

As a result of the dual clutch arrangement of the invention, the four planetary gear sets 720, 730, 740 and 750 are divided into first and second transmission subsets 760, 761 which are alternatively engaged to provide odd number and even number speed ranges, respectively. Transmission subset 760 includes planetary gear sets 720 and 730, and transmission subset 761 includes planetary gear sets 740 and 750. The output shaft 19 is continuously connected with a member of transmission subset 761.

In this family member, which is a derivative of the family member shown in FIG. 1a, rather than having two input clutches and nine synchronizers, four input clutches and seven synchronizers are utilized to achieve reduced content. The first input clutch and first, second and third synchronizers in FIG. 1a are here operatively replaced by a first, second and third input clutch 765, 766, 767 and the second input clutch in FIG. 1a remains here as a third input clutch 763. The input clutches 763, 765, 766 and 767 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 760, 761 prior to engaging the respective input clutch 763, 765, 766 or 767. The preselection is achieved by means of electronically controlled synchronizers. As shown, the planetary gear arrangement includes six torque transmitting mechanisms 764, 768, 769, 770, 771 and 772. The torque transmitting mechanisms 764 comprises a braking synchronizer, and the torque transmitting mechanisms 768, 769, 770, 771 and 772 comprise rotating synchronizers.

Accordingly, the input shaft 17 is alternately connected with the first and second transmission subsets 760, 761 (i.e. through clutch 765 to sun gear member 732, through clutch 766 to sun gear member 722, through clutch 767 to planet carrier assembly member 736, and through clutch 763 to ring gear member 744). The ring gear member 724 is continuously connected with the sun gear member 732 through the interconnecting member 774. The planet carrier assembly member 746 is continuously connected with the ring gear member 734 and the output shaft 19 through the interconnecting member 776. The ring gear member 754 is continuously connected with the transmission housing 780.

The planet carrier assembly member 726 is selectively connectable with the transmission housing 780 through the braking synchronizer 764. The sun gear member 732 is selectively connectable with the input shaft 17 through the clutch 765. The sun gear member 722 is selectively connectable with the input shaft 17 through the clutch 766. The planet carrier assembly member 736 is selectively connectable with the input shaft 17 through the input clutch 767. The planet carrier assembly member 726 is selectively connectable with the planet carrier assembly member 736 through the rotating synchronizer 768. The planet carrier assembly member 746 is selectively connectable with the planet carrier assembly member 756 through the rotating synchronizer 769. The planet carrier assembly member 746 is selectively connectable with the sun gear member 752 through the rotating synchronizer 770. The sun gear member 742 is selectively connectable with the planet carrier assembly member 756 through the rotating synchronizer 771. The sun gear member 742 is selectively connectable with the sun gear member 752 through the rotating synchronizer 772.

As shown in FIG. 8b, and in particular the truth table disclosed therein, the input clutches and torque transmitting mechanisms are selectively engaged in combinations of three to provide six forward speed ratios and a reverse speed ratio. Also given in the truth table is a set of numerical values that are attainable with the present invention utilizing the ring gear/sun gear tooth ratios given in FIG. 8b. The R1/S1 value is the tooth ratio of the planetary gear set 720; the R2/S2 value is the tooth ratio of the planetary gear set 730; the R3/S3 value is the tooth ratio of the planetary gear set 740; and the R4/S4 value is the tooth ratio of the planetary gear set 750.

FIG. 8b also provides a chart of the ratio steps between adjacent forward ratios and between the reverse and first forward ratio. For example, the ratio step between the first and second forward ratios is 1.95.

Those skilled in the art will recognize that the numerical value of the reverse speed ratio is determined utilizing the ring gear/sun gear tooth ratio of the planetary gear set 730. The numerical values of the first and fifth forward speed ratios are determined utilizing the ring gear/sun gear tooth ratios of the planetary gear sets 720, 730. The numerical values of the second and fourth forward speed ratios are determined utilizing the ring gear/sun gear tooth ratios of the planetary gear sets 740, 750. The numerical value of the third forward speed ratio is 1. The numerical value of the sixth forward speed ratio is determined utilizing the ring gear/sun gear tooth ratio of the planetary gear set 740.

FIGS. 9a and 9b illustrate a transmission wherein one of the torque transmitting mechanisms from a previously described configuration is eliminated to realize five forward speed ratios and a reverse speed ratio. Specifically, the powertrain 810, shown in FIG. 9a is identical to that shown in FIG. 7a, except that the rotating synchronizer 670 of FIG. 7a has been eliminated.

A powertrain 810, shown in FIG. 9a, has the conventional engine 12, a planetary transmission 814, and the final drive mechanism 16. The engine 12 is continuously connected with the input shaft 17. The planetary transmission 814 is drivingly connected with final drive mechanism 16 through output shaft 19. The planetary transmission 814 includes a planetary gear arrangement 818 that has a first planetary gear set 820, a second planetary gear set 830, a third planetary gear set 840, and fourth planetary gear set 850.

The planetary gear set 820 includes a sun gear member 822, a ring gear member 824, and a planet carrier assembly member 826. The planet carrier assembly member 826 includes a plurality of pinion gears 827 rotatably mounted on a carrier member 829 and disposed in meshing relationship with both the sun gear member 822 and the ring gear member 824.

The planetary gear set 830 includes a sun gear member 832, a ring gear member 834, and a planet carrier assembly member 836. The planet carrier assembly member 836 includes a plurality of pinion gears 837 rotatably mounted on a carrier member 839 and disposed in meshing relationship with both the sun gear member 832 and the ring gear member 834.

The planetary gear set 840 includes a sun gear member 842, a ring gear member 844, and a planet carrier assembly member 846. The planet carrier assembly member 846 includes a plurality of intermeshing pinion gears 847, 848 rotatably mounted on a carrier member 849 and disposed in meshing relationship with the ring gear member 844 and the sun gear member 842, respectively.

The planetary gear set 850 includes a sun gear member 852, a ring gear member 854, and a planet carrier assembly member 856. The planet carrier assembly member 856 includes a plurality of pinion gears 857 rotatably mounted on a carrier member 859 and disposed in meshing relationship with both the sun gear member 852 and the ring gear member 854.

As a result of the dual clutch arrangement of the invention, the four planetary gear sets 820, 830, 840 and 850 are divided into first and second transmission subsets 860, 861 which are alternatively engaged to provide odd number and even number speed ranges, respectively. Transmission subset 860 includes planetary gear sets 820 and 830, and transmission subset 861 includes planetary gear sets 840 and 850. The output shaft 19 is continuously connected with members of both subsets 860 and 861.

As mentioned above, the first and second input clutches 862, 863 are alternatively engaged for transmitting power from the input shaft 17 to transmission subset 860 or transmission subset 861. The first and second input clutches 862, 863 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratio selection is preselected within the transmission subsets 860, 861 prior to engaging the respective input clutches 862, 863. The preselection is achieved by means of electronically controlled synchronizers. As shown, the planetary gear arrangement includes eight torque transmitting mechanisms 864, 865, 866, 867, 868, 869, 871 and 872. The torque transmitting mechanism 864 comprises a braking synchronizer, and the torque transmitting mechanisms 865, 866, 867, 868, 869, 871 and 872 comprise rotating synchronizers.

Accordingly, the input shaft 17 is alternately connected with the first and second transmission subsets 860, 861 (i.e. through clutch 862 to synchronizers 865, 866, and through clutch 863 to ring gear member 844). The planet carrier assembly member 826 is continuously connected with the ring gear member 834 through the interconnecting member 874. The planet carrier assembly member 846 is continuously connected with the ring gear member 824 and the output shaft 19 through the interconnecting member 876. The planet carrier assembly member 856 is continuously connected with the transmission housing 880.

The sun gear member 822 is selectively connectable with the transmission housing 880 through the braking synchronizer 864. The sun gear member 832 is selectively connectable with the input shaft 17 through the input clutch 862 and the rotating synchronizer 865. The planet carrier assembly member 836 is selectively connectable with the input shaft 17 through the input clutch 862 and the rotating synchronizer 866. The sun gear member 822 is selectively connectable with the sun gear member 832 through the rotating synchronizer 867. The ring gear member 824 is selectively connectable with the planet carrier assembly member 836 through the rotating synchronizer 868. The planet carrier assembly member 846 is selectively connectable with the ring gear member 854 through the rotating synchronizer 869. The sun gear member 842 is selectively connectable with the ring gear member 854 through the rotating synchronizer 871. The sun gear member 842 is selectively connectable with the sun gear member 852 through the rotating synchronizer 872.

As shown in FIG. 9b, and in particular the truth table disclosed therein, the input clutches and torque transmitting mechanisms are selectively engaged in combinations of at least three to provide five forward speed ratios and a reverse speed ratio. A sample of numerical values for the individual ratios is also given in the truth table of FIG. 9b. These numerical values have been calculated using the ring gear/sun gear tooth ratios also given by way of example in FIG. 9b. The R1/S1 value is the tooth ratio of the planetary gear set 820; the R2/S2 value is the tooth ratio of planetary gear set 830; the R3/S3 value is the tooth ratio of the planetary gear set 840; and the R4/S4 value is the tooth ratio of the planetary gear set 850. FIG. 9b also describes the ratio steps between adjacent forward ratios and between the reverse and first forward ratio. For example, the ratio step between the first and second forward ratios is 1.60. Those skilled in the art will recognize that the numerical value of the reverse speed ratio is determined utilizing the ring gear/sun gear tooth ratios of the planetary gear sets 840, 850. The numerical values of the first and fifth forward speed ratios are determined utilizing the ring gear/sun gear tooth ratios of the planetary gear sets 820, 830. The numerical value of the second forward speed ratio is 1. The numerical value of the third forward speed ratio is determined utilizing the ring gear/sun gear tooth ratio of the planetary gear set 820. The numerical value of the fourth forward speed ratio is determined utilizing the ring gear/sun gear tooth ratio of the planetary gear set 840.

While the best modes for carrying out the invention have been described in detail, those familiar with the art to which this invention relates will recognize various alternative designs and embodiments for practicing the invention within the scope of the appended claims.

What is claimed is:

1. A multi-speed transmission comprising:
   an input shaft;
   an output shaft;
   first, second, third and fourth planetary gear sets each having first, second and third members;
   a first interconnecting member continuously interconnecting said first member of said first planetary gear set with said first member of said second planetary gear set;
   a second interconnecting member continuously interconnecting a member of said first or second planetary gear set with said first member of said third planetary gear set and said output shaft;
   said first member of said fourth planetary gear set being continuously connected with a stationary member;
   a first input clutch continuously connected with said input shaft;
   a second input clutch selectively interconnecting said input shaft with said second member of said third planetary gear set;
   first and second torque-transmitting mechanisms selectively interconnecting members of said first and second planetary gear sets with said first input clutch;
   third and fourth torque-transmitting mechanisms selectively interconnecting members of said first and second planetary gear sets with other members of said first or second planetary gear set or with said first input clutch;
   fifth, sixth, seventh and eighth torque-transmitting mechanisms selectively interconnecting members of said third planetary gear set with said second and third members of said fourth planetary gear set;
   a ninth torque-transmitting mechanism selectively interconnecting a member of said first or second planetary gear set, that is not continuously connected with said output shaft, with said stationary member; and
   said input clutches and torque-transmitting mechanisms being engaged in combinations of at least three to provide at least six forward speed ratios and a reverse speed ratio.

2. The transmission defined in claim 1, wherein said nine torque-transmitting mechanisms comprise synchronizers.

3. The transmission defined in claim 1, wherein said ninth torque-transmitting mechanism comprises a braking synchronizer, and said first, second, third, fourth, fifth, sixth, seventh and eighth torque-transmitting mechanisms comprise rotating synchronizers.

4. The transmission defined in claim 1, wherein said first input clutch is applied for odd number speed ranges and said second input clutch is applied for even number speed ranges.

5. The transmission defined in claim 1, wherein said first input clutch is applied for even number speed ranges and said second input clutch is applied for odd number speed ranges.

6. The transmission defined in claim 1, wherein said first input clutch and said second input clutch are interchangeable to shift from odd number speed ranges to even number speed ranges, and vice versa.

7. The transmission defined in claim 1, wherein selected ones of said nine torque-transmitting mechanisms are engaged prior to gear shifting to achieve shifting without torque interruptions.

8. The transmission defined in claim 1, wherein at least two of said synchronizers comprise a double synchronizer to reduce cost and package size.

9. A multi-speed transmission comprising:
   an input shaft;
   an output shaft;
   first, second, third and fourth planetary gear sets each having first, second and third members;
   a first interconnecting member continuously interconnecting said first member of said first planetary gear set with said first member of said second planetary gear set;
   a second interconnecting member continuously interconnecting a member of said first or second planetary gear set with said first member of said third planetary gear set and said output shaft;
   said first member of said fourth planetary gear set being continuously connected with a stationary member;
   a first input clutch continuously connected with said input shaft;

a second input clutch selectively interconnecting said input shaft with said second member of said third planetary gear set;

nine torque-transmitting mechanisms for selectively interconnecting said members of said first, second, third or fourth planetary gear sets with said first input clutch, said output shaft, said first or second interconnecting member, said stationary member or with other members of said planetary gear sets, said input clutches and nine torque-transmitting mechanisms being engaged in combinations of at least three to establish at least six forward speed ratios and a reverse speed ratio between said input shaft and said output shaft.

10. The transmission defined in claim 9, wherein first and second of said nine torque-transmitting mechanisms are selectively operable for interconnecting members of said first or second planetary gear sets with said first input clutch.

11. The transmission defined in claim 9, wherein third and fourth of said nine torque-transmitting mechanisms are selectively operable for interconnecting members of said first or second planetary gear sets with other members of said first or second planetary gear set, or with said first input clutch.

12. The transmission defined in claim 9, wherein fifth, sixth, seventh and eighth of said nine torque-transmitting mechanisms are selectively operable for interconnecting members of said third planetary gear set with said second and third members of said fourth planetary gear set.

13. The transmission defined in claim 9, wherein a ninth of said nine torque-transmitting mechanisms is operable for selectively interconnecting a member of said first or second planetary gear set, that is not continuously connected with said output shaft, with said stationary member.

14. The transmission defined in claim 9, wherein planet carrier assembly members of a plurality of said planetary gear sets are of the single pinion type.

15. The transmission defined in claim 9, wherein planet carrier assembly members of a plurality of said planetary gear sets are of the double pinion type.

16. The transmission defined in claim 9, wherein each of said nine torque-transmitting mechanisms comprises a synchronizer.

17. The transmission defined in claim 9, wherein said first input clutch is applied for odd number speed ranges and said second input clutch is applied for even number speed ranges.

18. The transmission defined in claim 9, wherein said first input clutch is applied for even number speed ranges and said second input clutch is applied for odd number speed ranges.

19. The transmission defined in claim 9, wherein selected ones of said nine torque-transmitting mechanisms are engaged prior to gear shifting to achieve shifting without torque interruptions.

20. A multi-speed transmission comprising:

an input shaft;

an output shaft;

first, second, third and fourth planetary gear sets each having first, second and third members;

a first interconnecting member continuously interconnecting said first member of said first planetary gear set with said first member of said second planetary gear set;

a second interconnecting member continuously interconnecting a member of said first or second planetary gear set with said first member of said third planetary gear set and said output shaft;

said first member of said fourth planetary gear set being continuously connected with a stationary member;

first and second torque-transmitting mechanisms selectively interconnecting members of said first and second planetary gear set with said input shaft and, therefore, alternately functioning as a first input clutch;

a second input clutch selectively interconnecting said input shaft with said second member of said third planetary gear set;

third and fourth torque-transmitting mechanisms selectively interconnecting members of said first or second planetary gear sets with other members of said first or second planetary gear set, or with said input shaft;

fifth, sixth, seventh and eighth torque-transmitting mechanisms selectively interconnecting members of said third planetary gear set with said second and third members of said fourth planetary gear set;

a ninth torque-transmitting mechanism selectively interconnecting a member of said first or second planetary gear sets, that is not continuously connected with said output shaft, with said stationary member; and said input clutches and torque-transmitting mechanisms being engaged in combinations of at least three to provide at least six forward speed ratios and a reverse speed ratio.

21. The transmission defined in claim 20, wherein said nine torque-transmitting mechanisms comprise synchronizers.

22. The transmission defined in claim 20, wherein said first input clutch is applied for odd number speed ranges and said second input clutch is applied for even number speed ranges.

23. The transmission defined in claim 20, wherein said first input clutch is applied for even number speed ranges and said second input clutch is applied for odd number speed ranges.

24. The transmission defined in claim 20, wherein said first input clutch and said second input clutch are interchangeable to shift from odd number speed ranges to even number speed ranges, and vice versa.

25. The transmission defined in claim 20, wherein selected ones of said nine torque-transmitting mechanisms are engaged prior to gear shifting to achieve shifting without torque interruptions.

26. The transmission defined in claim 20, wherein at least two of said synchronizers comprise a double synchronizer to reduce cost and package size.

27. A multi-speed transmission comprising:

an input shaft;

an output shaft;

first, second, third and fourth planetary gear sets each having first, second and third members;

a first interconnecting member continuously interconnecting said first member of said first planetary gear set with said first member of said second planetary gear set;

a second interconnecting member continuously interconnecting a member of said first or second planetary gear set with said first member of said third planetary gear set and said output shaft;

said first member of said fourth planetary gear set being continuously connected with a stationary member;

a first input clutch continuously connected with said input shaft;

a second input clutch selectively interconnecting said input shaft with said second member of said third planetary gear set;

eight torque-transmitting mechanisms for selectively interconnecting said members of said first, second, third or fourth planetary gear sets with said first input clutch, said output shaft, said first or second interconnecting member, said stationary member or with other members of said planetary gear sets, said input clutches and eight torque-transmitting mechanisms being engaged in combinations of at least three to establish at least five forward speed ratios and a reverse speed ratio between said input shaft and said output shaft.

28. The transmission defined in claim 27, wherein first and second of said eight torque-transmitting mechanisms are selectively operable for interconnecting members of said first or second planetary gear sets with said first input clutch.

29. The transmission defined in claim 27, wherein third and fourth of said eight torque-transmitting mechanisms are selectively operable for interconnecting members of said first or second planetary gear sets with other members of said first or second planetary gear set, or with said first input clutch.

30. The transmission defined in claim 27, wherein fifth, sixth and seventh and of said eight torque-transmitting mechanisms are selectively operable for interconnecting members of said third planetary gear set with members of said fourth planetary gear set.

31. The transmission defined in claim 27, wherein an eighth of said eight torque-transmitting mechanisms is operable for selectively interconnecting a member of said first or second planetary gear set, that is not continuously connected with said output shaft, with said stationary member.

32. The transmission defined in claim 27, wherein planet carrier assembly members of a plurality of said planetary gear sets are of the single pinion type.

33. The transmission defined in claim 27, wherein planet carrier assembly members of a plurality of said planetary gear sets are of the double pinion type.

34. The transmission defined in claim 27, wherein each of said eight torque-transmitting mechanisms comprises a synchronizer.

35. The transmission defined in claim 27, wherein said first input clutch is applied for odd number speed ranges and said second input clutch is applied for even number speed ranges.

36. The transmission defined in claim 27, wherein said first input clutch is applied for even number speed ranges and said second input clutch is applied for odd number speed ranges.

37. The transmission defined in claim 27, wherein selected ones of said eight torque-transmitting mechanisms are engaged prior to gear shifting to achieve shifting without torque interruptions.

* * * * *